United States Patent
Silver

(10) Patent No.: US 8,237,099 B2
(45) Date of Patent: Aug. 7, 2012

(54) METHOD AND SYSTEM FOR OPTOELECTRONIC DETECTION AND LOCATION OF OBJECTS

(75) Inventor: William M. Silver, Weston, MA (US)

(73) Assignee: Cognex Corporation, Natick, MA (US)

( * ) Notice: Subject to any disclaimer, the term of this patent is extended or adjusted under 35 U.S.C. 154(b) by 273 days.

(21) Appl. No.: 11/763,752

(22) Filed: Jun. 15, 2007

(65) Prior Publication Data

US 2008/0309920 A1      Dec. 18, 2008

(51) Int. Cl.
   *H01L 27/00* (2006.01)
   *G06K 9/00* (2006.01)

(52) U.S. Cl. .............. 250/208.1; 348/135; 382/124; 382/312

(58) Field of Classification Search .......... 250/208.1; 348/135; 382/124, 312
   See application file for complete search history.

(56) References Cited

U.S. PATENT DOCUMENTS

| | | |
|---|---|---|
| 4,214,265 A | 7/1980 | Olesen |
| 4,384,195 A | 5/1983 | Nosler |
| 4,647,979 A | 3/1987 | Urata |
| 4,847,772 A | 7/1989 | Michalopoulos et al. |
| 4,896,211 A | 1/1990 | Hunt |
| 4,962,538 A | 10/1990 | Eppler et al. |
| 5,018,213 A | 5/1991 | Sikes |
| 5,040,056 A | 8/1991 | Sager et al. |
| 5,121,201 A | 6/1992 | Seki |
| 5,164,998 A | 11/1992 | Reinsch et al. |
| 5,184,217 A | 2/1993 | Doering |
| 5,210,798 A | 5/1993 | Ekchian et al. |
| 5,233,541 A | 8/1993 | Corwin et al. |
| 5,298,697 A | 3/1994 | Suzuki et al. |
| 5,317,645 A | 5/1994 | Perozek et al. |
| 5,457,490 A | 10/1995 | Doane |
| 5,481,712 A | 1/1996 | Silver et al. |
| 5,581,625 A | 12/1996 | Connell et al. |
| 5,687,249 A | 11/1997 | Kato |
| 5,717,834 A | 2/1998 | Werblin et al. |
| 5,734,742 A | 3/1998 | Asaeda |
| 5,751,831 A | 5/1998 | Ono |
| 5,760,390 A | 6/1998 | Vezzalini |
| 5,802,220 A | 9/1998 | Black et al. |
| 5,809,161 A | 9/1998 | Auty et al. |
| 5,852,669 A | 12/1998 | Eleftheriadis et al. |

(Continued)

FOREIGN PATENT DOCUMENTS

EP      0939382      9/1999

(Continued)

OTHER PUBLICATIONS

0-K SEC Filing—iQ 180 Products, Adaptive Optics Associates 900 Coles Road Blackwood, NJ 08012-4683, Publication Date Dec. 2003.

(Continued)

*Primary Examiner* — John Lee

(57) ABSTRACT

Disclosed are methods and systems for optoelectronic detection and location of moving objects. The disclosed methods and systems capture one-dimensional images of a field of view through which objects may be moving, make measurements in those images, select from among those measurements those that are likely to correspond to objects in the field of view, make decisions responsive to various characteristics of the objects, and produce signals that indicate those decisions. The disclosed methods and systems provide excellent object discrimination, electronic setting of a reference point, no latency, high repeatability, and other advantages that will be apparent to one of ordinary skill in the art.

68 Claims, 9 Drawing Sheets

U.S. PATENT DOCUMENTS

| | | | |
|---|---|---|---|
| 5,932,862 A | 8/1999 | Hussey et al. | |
| 5,942,741 A | 8/1999 | Longacre et al. | |
| 5,943,432 A | 8/1999 | Gilmore et al. | |
| 5,960,097 A | 9/1999 | Pfeiffer et al. | |
| 5,960,125 A | 9/1999 | Michael et al. | |
| 6,046,764 A | 4/2000 | Kirby et al. | |
| 6,049,619 A | 4/2000 | Anandan et al. | |
| 6,061,471 A | 5/2000 | Coleman, Jr. et al. | |
| 6,072,494 A | 6/2000 | Nguyen | |
| 6,072,882 A | 6/2000 | White et al. | |
| 6,088,467 A * | 7/2000 | Sarpeshkar et al. | 382/100 |
| 6,115,480 A | 9/2000 | Washizawa | |
| 6,160,494 A | 12/2000 | Sodi et al. | |
| 6,173,070 B1 | 1/2001 | Michael et al. | |
| 6,175,644 B1 | 1/2001 | Scola et al. | |
| 6,175,652 B1 | 1/2001 | Jacobson et al. | |
| 6,184,924 B1 | 2/2001 | Schneider et al. | |
| 6,215,892 B1 | 4/2001 | Douglass et al. | |
| 6,282,462 B1 | 8/2001 | Hopkins | |
| 6,285,787 B1 | 9/2001 | Kawachi et al. | |
| 6,301,610 B1 | 10/2001 | Ramser et al. | |
| 6,333,993 B1 | 12/2001 | Sakamoto | |
| 6,346,966 B1 | 2/2002 | Toh | |
| 6,347,762 B1 | 2/2002 | Sims et al. | |
| 6,360,003 B1 | 3/2002 | Doi et al. | |
| 6,396,517 B1 | 5/2002 | Beck et al. | |
| 6,396,949 B1 | 5/2002 | Nichani | |
| 6,483,935 B1 | 11/2002 | Rostami et al. | |
| 6,487,304 B1 | 11/2002 | Szeliski | |
| 6,525,810 B1 | 2/2003 | Kipman | |
| 6,526,156 B1 | 2/2003 | Black et al. | |
| 6,539,107 B1 | 3/2003 | Michael et al. | |
| 6,545,705 B1 | 4/2003 | Sigel et al. | |
| 6,549,647 B1 | 4/2003 | Skunes et al. | |
| 6,573,929 B1 | 6/2003 | Glier et al. | |
| 6,580,810 B1 | 6/2003 | Yang et al. | |
| 6,587,122 B1 | 7/2003 | King et al. | |
| 6,597,381 B1 | 7/2003 | Eskridge et al. | |
| 6,608,930 B1 | 8/2003 | Agnihotri et al. | |
| 6,618,074 B1 | 9/2003 | Seeley et al. | |
| 6,628,805 B1 | 9/2003 | Hansen et al. | |
| 6,646,244 B2 * | 11/2003 | Aas et al. | 250/205 |
| 6,668,075 B1 | 12/2003 | Nakamura | |
| 6,741,977 B1 | 5/2004 | Nagaya et al. | |
| 6,891,570 B2 | 5/2005 | Tantalo et al. | |
| 6,944,584 B1 | 9/2005 | Tenney et al. | |
| 6,985,827 B2 | 1/2006 | Williams et al. | |
| 6,987,528 B1 | 1/2006 | Nagahisa et al. | |
| 6,997,556 B2 | 2/2006 | Pfleger | |
| 6,999,625 B1 | 2/2006 | Nelson et al. | |
| 7,062,071 B2 | 6/2006 | Tsujino et al. | |
| 7,085,401 B2 | 8/2006 | Averbuch et al. | |
| 7,088,387 B1 | 8/2006 | Freeman et al. | |
| 7,088,846 B2 | 8/2006 | Han et al. | |
| 7,175,090 B2 | 2/2007 | Nadabar | |
| 7,227,978 B2 * | 6/2007 | Komatsuzaki et al. | 382/124 |
| 7,274,808 B2 * | 9/2007 | Baharav et al. | 382/124 |
| 7,546,026 B2 | 6/2009 | Pertsel et al. | |
| 2002/0005895 A1 | 1/2002 | Freeman et al. | |
| 2002/0177918 A1 | 11/2002 | Pierel et al. | |
| 2002/0196336 A1 | 12/2002 | Batson et al. | |
| 2002/0196342 A1 | 12/2002 | Walker et al. | |
| 2003/0113018 A1 | 6/2003 | Nefian et al. | |
| 2003/0120714 A1 | 6/2003 | Wolff et al. | |
| 2003/0137590 A1 | 7/2003 | Barnes et al. | |
| 2003/0219146 A1 | 11/2003 | Jepson et al. | |
| 2004/0148057 A1 | 7/2004 | Breed et al. | |
| 2004/0218806 A1 | 11/2004 | Miyamoto et al. | |
| 2005/0275831 A1 | 12/2005 | Silver | |
| 2005/0276445 A1 | 12/2005 | Silver et al. | |
| 2006/0146377 A1 | 7/2006 | Marshall et al. | |
| 2006/0223628 A1 | 10/2006 | Walker et al. | |
| 2007/0009152 A1 | 1/2007 | Kanda | |
| 2007/0019094 A1 | 1/2007 | Silberstein | |
| 2008/0063245 A1 * | 3/2008 | Benkley et al. | 382/124 |
| 2008/0166015 A1 | 7/2008 | Haering et al. | |
| 2008/0167890 A1 | 7/2008 | Pannese et al. | |
| 2008/0205714 A1 * | 8/2008 | Benkley et al. | 382/126 |
| 2008/0219521 A1 * | 9/2008 | Benkley et al. | 382/124 |
| 2008/0226132 A1 * | 9/2008 | Gardner | 382/107 |
| 2008/0285802 A1 | 11/2008 | Bramblet et al. | |
| 2008/0310676 A1 | 12/2008 | Silver | |
| 2009/0121027 A1 | 5/2009 | Nadabar | |
| 2009/0154779 A1 * | 6/2009 | Satyan et al. | 382/124 |
| 2010/0155477 A1 | 6/2010 | Nadabar | |

FOREIGN PATENT DOCUMENTS

| | | |
|---|---|---|
| EP | 0815688 | 5/2000 |
| EP | 1734456 | 12/2006 |
| GB | 2226130 | 6/1991 |
| GB | 2309078 | 7/1997 |
| JP | 60 147602 A | 8/1985 |
| WO | WO-2008156608 | 12/2008 |

OTHER PUBLICATIONS

ADSP-BF533 Blackfin Processor Hardware Reference, Analog Devices Inc.—Media Platforms and Services Group Preliminary Revision—Part No. 82-002005-01, Date Mar. 2003.

CCD/CMOS Sensors Spot Niche Application, PennWell Corporation, Vision System Design—Imaging and Machine Vision Technology, Publication Date 2004.

Cognex 3000/4000/5000 Image Processing, Revision 7.4 590-0135 Edge Detection Tool, 1996.

Cognex 4000/5000 SMD Placement Guidance Package, User's Manual, Release 3.8.00, Chapter 15, pp. 590-6168 Publication Date, 1998.

Cognex VisionPro, Getting Started—QuickStart Tutorial, Cognex Corporation, 590-6560, Revision 3.5 Ref. pp. 69-94, Publication Date May 2004.

CV-2100 Series, Keyence America http://www.keyence.com/products/vision/cv_2100_spec.html, High-Speed Digital Machine Vision System, Publication Date Dec. 29, 2003.

CVL Vision Tools Guide, Cognex MVS-8000 Series, Chapter 5, Symbol Tool, CVL 5.4, Publication Date Dec. 1999.

European Patent Application No. 05 758 780.0, Communication pursuant to 94(3) EPC, Mar. 25, 2009.

Laser Scanning Product Guide, Adaptive Optics Associates—Industrial Products and Systems 90 Coles Road Blackwood, NJ 08012, Industrial Holographic and Conventional Laser 1D, Omnidirectional Bar Codes Scanners Publication Date Mar. 2003.

Matsushita Imagecheckers, NAiS Machine Vision—Matsushita Machine Vision Systems, 2003.

Matsushita LightPix AE10, NAiS Machine Vision—Matsushita Machine Vision Systems, 2003.

The International Search Report and Written Opinion of the International Searching Authority, International Application No. PCT/US2005/019923, Jan. 9, 2006.

Asundi, A., et al., High-Speed TDI Imaging for Peripheral Inspection, Proc. SPIE vol. 2423, Machine Vision Applications in Industrial Inspection III, Frederick Y. Wu; Stephen S. Wilson; Eds., Ref. pp. 189-194.

Baillard, C., et al, Automatic Reconstruction of Piecewise Planar Models from Multiple Views CVPR, vol. 02, No. 2 Ref. pp. 2559, Publication Date 1999.

Baumberg, A. M., et al, Learning Flexible Models from Image Sequences, University of Leeds, School of Computer Studies, Research Report Series, Report 93.36, Ref. pp. 1-13, Publication Date Oct. 1993.

Chang, Dingding, et al, Feature Detection of Moving Images using a Hierarchical Relaxation Method, IEICE Trans. Inf. & Syst., Vol. E79-D, Jul. 7, 1996.

Chen, Y. H., Computer Vision for General Purpose Visual Inspection: a Fuzzy Logic Approach, Optics and Lasers in Engineering 22, Elsevier Science Limited, vol. 22, No. 3, Ref. pp. 182-192, Publication date, 1995.

Cognex Corporation, Screen shot of the CheckMate GUI Ver 1.6, 2005.

Cognex Corporation, Sensorpart FA45 Vision Sensor, Sep. 29, 2006.

Cordin Company, Electronic Imaging Systems, High Speed Imaging Solutions: 200-500 Series Cameras, Aug. 4, 2004.

Corke, Peter I., et al, Real Time Industrial Machine Vision, Electrical Engineering Congress Sydney, Australia, CSIRO Division of Manufacturing Technology, 1994.

DeMotte, Donald, Visual Line Tracking, Application Overview & Issues Machine Vision for Robot Guidance Workshop, May 5, 2004.

Denis, Jolivet, LabVIEW and IMAQ Vision Builder Provide Automated Visual Test System, Semiconductor: IMAQ Advanced Analysis Toolkit, IMAQ Vision Builder—LabVIEW—National Instruments—XP002356529—URL http://www.ni.com/pdf/csma/us/JNDESWG.pdf, 2001.

Di Mauro, E. C., et al, Check—a generic and specific industrial inspection tool, IEE Proc.-Vis. Image Signal Process. vol. 143, No. 4, Ref. pp. 241-249, Publication Date Aug. 27, 1996.

Haering, N., et al, Visual Event Detection, Kluwer Academic Publishers, Chapter 2, Section 8, 2001.

Kahn, Phillip, Building blocks for computer vision systems, IEEE Expert, vol. 8, No. 6, XP002480004, Ref. pp. 40-50, Publication Date Dec. 6, 1993.

Kim, ZuWhan, et al., Automatic Description of Complex Buildings with Multiple Images, IEEE 0-7695-0813-8/00, Ref. pp. 155-162, Publication Date 2000.

Matrox, Interactive Windows Imaging Software for Industrial and Scientific Applications, Inspector 4.0—Matrox Imaging, 8pages Apr. 15, 2002.

Blackfin Processor Instruction Set Reference Analog Devices, Inc., Revision 2.0, Part No. 82-000410-14 Publication Date May, 2003.

Photron USA, FASTCAM PCI, Sep. 24, 2004.

Rohr, K., Incremental Recognition of Pedestrians from Image Sequences, CVPR93, 1993.

Siemens AG, Simatic Machine Vision, Simatic VS 100 Series, www.siemens.com/machine-vision, Apr. 1, 2003.

Stauffer, Chris, et al, Tracking-Based Automatic Object Recognition, Artificial Intelligence Laboratory, Massachusetts Institute of Technology, Cambridge, MA http://www.ai.mit.edu, Ref. pp. 133-134 Publication Date 2001.

Uno, T., et al, A Method of Real-Time Recognition of Moving Objects and its Application, Pattern Recognition; Pergamon Press, vol. 8, pp. 201-208, Ref. pp. 201-208, Publication Date 1976.

West, Perry C., High Speed, Real-Time Machine Vision, Imagenation and Automated Vision Systems, Inc., 2001.

Whelan, P., et al, Machine Vision Algorithms in Java, Chapter 1—An Introduction to Machine Vision, Springer-verlag, XP002480005, 2001.

Zarandy, Akos, et al, Ultra-High Frame Rate Focal Plane Image Sensor and Processor, IEEE Sensors Journal, vol. 2, No. 6, 2002.

Zarandy, A., et al, Vision Systems Based on the 128X128 Focal Plane Cellular Visual Microprocessor Chips, IEEE Ref. pp. III-518-III-521, Publication Date Mar. 2003.

European filed history for European application No. 08779633, dated Dec. 24, 2008 through Jul. 7, 2011.

Cognex Corporation, "Cognex 3000/4000/5000", *Vision Tools*, Revision 7.6, 590-0136, Chapter 10 Auto-Focus, (1996).

Cognex Corporation, "Cognex 3000/4000/5000", *Vision Tools*, Revision 7.6, 590-0136, Chapter 13 Golden Template Comparison, (1996).

"Non-Final Office Action, U.S. Appl. No. 11/763,752, dated Sep. 4, 2009".

"Response to Non-Final Office Action, U.S. Appl. No. 11/763,752, dated Sep. 4, 2009, filed Dec. 18, 2009".

"Notice of Allowance, U.S. Appl. No. 11/763,752, dated Mar. 23, 2010".

"Amendment and Response to Notice of Allowance, U.S. Appl. No. 11/763,752, dated Mar. 23, 2010, filed Jun. 28, 2010".

"Non-Final Office Action, U.S. Appl. No. 11/763,752, dated Aug. 5, 2010".

"Response to Non-Final Office Action, U.S. Appl. No. 11/763,752, dated Aug. 5, 2010, filed Feb. 7, 2011".

"Final Office Action, U.S. Appl. No. 11/763,752, dated Apr. 6, 2011".

"Response to Final Office Action, U.S. Appl. No. 11/763,752, dated Apr. 6, 2011, filed Jul. 6, 2011".

"Notice of Allowance, U.S. Appl. No. 11/763,752, dated Aug. 5, 2011".

"International Preliminary Report on Patentability, Application No. PCT/US2008/007302, dated Jan. 6, 2010".

"International Search Report, Application No. PCT/US2008/007302, dated Dec. 23, 2009".

"Response to the Official Communication dated Apr. 6, 2011, European Application No. 08779633.0, filed Jul. 7, 2011".

"International Preliminary Report on Patentability, Application No. PCT/US2008/007280, dated Jan. 6, 2010 ".

"Amendment to European Application No. 08779633.0, dated Dec. 16, 2009".

"International Search Report, Application No. PCT/US2008/007280, dated Dec. 23, 2009".

* cited by examiner

METHOD AND SYSTEM FOR OPTOELECTRONIC DETECTION AND LOCATION OF OBJECTS

FIELD OF THE INVENTION

The invention relates to optoelectronic sensors for detecting objects and providing information describing the objects, particularly their location.

BACKGROUND OF THE INVENTION

Optoelectronic sensors for detecting and locating objects are valuable in a wide variety of fields; one example is industrial automation. In order to understand the operation, capabilities, and limitations of such sensors, consider a specific example application—printing alphanumeric characters on labels in a high-speed production bottling line. In a typical such application, a sensor detects the presence of a bottle at a predetermined point as it moves down the production line, and produces a signal that tells a printer to start printing when a bottle is located at that point.

If a signal is produced when a bottle is at the proper location, desired alphanumeric characters are printed on the bottle's label in a desired location. If a bottle is not detected, however, its label will not be printed, a potentially costly mistake. If a signal is produced when no bottle i present, the printer may spray ink into the air, which may have adverse effects on the production process. If a signal is produced when a bottle is present but not in the proper location, the characters will be printed in the wrong location on the label.

From this example it can see seen that an optoelectronic sensor for detecting and locating objects should detect only the desired objects, and only in the desired location.

Photoelectric sensors, which comprise a type of optoelectronic sensor, have long been used to detect and locate objects. Such sensors typically operate by emitting a beam of light and detecting light received. They come in a variety of configurations suitable for a variety of applications, including the following:

In one configuration an emitter and a receiver are placed at opposite ends of a path, so that anything crossing the path that is not transparent breaks the beam of light; an object is detected when the receiver sees very little light. The placement of the emitter and receiver determines the path and thereby the location at which an object is detected. The application is constrained to insure that only desired objects cross the path, and so that determining the location of an edge of the object is all that is needed. In the bottling application, for example, this would mean that the label is in a fixed position relative to the edge of the bottle.

In a second configuration an emitter and receiver are placed in one location, with a retro-reflector placed at the opposite end of a path that reflects the beam from the emitter back to the receiver. This configuration is similar to the previous, but is more convenient to install because all of the required wiring is done at only one end of the path instead of at both ends. However, if the objects to be detected are reflective, misdetection and/or mislocation errors may occur.

In a third configuration an emitter and receiver are placed in one location, and the emitter emits a focused beam of light so that anything sufficiently reflective crossing in front of the beam reflects it back to the receiver. An object is detected when the receiver sees an amount of light above some predefined threshold. The placement of the emitter/receiver assembly determines the location of the beam and thereby the location at which an object is detected. The use of a focused beam makes this location relatively precise, and reduces the chances of misdetecting objects in the background because the beam will be out of focus. The objects and their environment are constrained so that the reflected light exceeds the threshold only when desired objects are in the desired location.

A fourth configuration is a variation of the third wherein a diffuse beam of light is used instead of a focused beam. This makes it easier to detect objects whose positions are not well constrained, but decreases the precision of the location at which objects are detected and increases the chances that a detection will occur when no desired object is in front of the beam.

Photoelectric sensors of these types include those manufactured and sold by Banner Engineering Corp., of Minneapolis, Minn., for example their MINI-BEAM® line.

Photoelectric sensors typically provide a simple signal to indicate that an object has been detected, and to indicate its location. Such a signal has two states, which might be called "present" and "absent". In the first and second configuration, for example, the signal would be in the "present" state when little light is detected by the receiver; in third or fourth configuration, the signal would be in the "present" state when light above a threshold is detected by the receiver.

An object is detected when the signal is in the "present" state. A moving object is located by the time of a transition from "absent" to "present" on the signal—the object is located in a known, predetermined position, called herein a reference point, at the time of the transition. For any of the four photoelectric sensor configurations described above, the reference point is determined by the position of the beam and is adjusted by physically moving the sensor. Note that as used herein the reference point refers to the desired location of the object; the actual location of the object at the signal time may differ for various reasons as described herein.

Usually a photoelectric sensor is used to detect specific objects and locate them at a specific position, for example to detect bottles moving down a conveyer belt and indicate the time at which the leading edge of such a bottle has reached a certain reference point, for example in front of a printer. No sensor is a perfect judge of object presence and location, and failures will result if a desired object is not detected, if some other condition, such as an unexpected object or light source, results in a false detection, or if a desired object is detected but mislocated.

In order to increase the reliability of detection and location, a photoelectric sensor may employ one or more techniques. The different configurations described above, for example, allow different tradeoffs between missed objects, false detection, and other factors that can be matched to the needs of a specific application. For example, a retro-reflective configuration is unlikely to miss an object but requires mounting two elements, the sensor and the reflector, in suitable locations. A focused beam is less likely to detect an unexpected object because it has a narrow range of focus.

A sensitivity adjustment is typically used as another tradeoff between missed objects and false detection for each sensor configuration. In the focused beam configuration, for example, the sensitivity adjustment determines the predefined detection threshold. Increasing the threshold makes false detections less likely but missed objects more likely; decreasing the threshold makes the opposite tradeoff.

In addition, sensors may employ a suitably modulated beam of light so that stray light is unlikely to cause a misdetection. For example, the beam can be pulsed on and off at a high frequency, and the receiver is designed to only detect light pulsed at that frequency.

A commonly used term of art for photoelectric sensors is background suppression, which describes various means for ignoring reflections of the emitted beam by objects in the background (i.e. beyond some predetermined distance), so that misdetection can be made less likely. U.S. Pat. No. 5,760,390, for example, describes such a device as well as providing information on prior art devices.

Photoelectric sensors are well-suited to object detection and location, and are widely used, but they have a variety of limitations.

Such sensors have a very limited ability to distinguish desired objects from other conditions such as unexpected objects, variations in object reflectivity, confusing markings or features on the objects, and the like. Generally all the sensor can measure is how much light it's receiving. A gray object at 5 centimeters distance, for example, might reflect as much light back to the receiver as a white object at 10 centimeters, even if the beam is somewhat out of focus at 10 centimeters. Considerable care must be taken to insure that the presence of a desired object at a desired location, and no other condition, results in an amount of light received that is above or below a predetermined threshold. This limits the ways in which such sensors can be installed, the nature of objects to be detected and located, and the manner in which such objects are presented to the sensor, among other concerns. Furthermore, generally only edges of objects can be detected and located; it is difficult and in many cases impractical to detect and locate markings or other features on the object.

With a photoelectric sensor, establishing or adjusting the reference point generally involves physically moving the sensor. Such an adjustment is challenging to make and may have undesirable consequences if not made carefully. Furthermore, it is difficult to establish a reference point with high precision.

Photoelectric sensors have an inherent delay between the time that an object crosses the reference point and the time that the signal transition occurs. This delay is commonly called latency or response time, and is typically of the order of hundreds of microseconds. An object will move away from the reference point during this delay, by a distance that increases as object velocity increases. Furthermore, since a reference point is usually established at installation time using stationary objects, the actual location of the object at the signal time will always be different in production use where the objects are moving. If the latency and velocity are known it may be possible to compensate for the latency, but doing so adds complexity and cost, and might not always be practical.

The latency of a photoelectric sensor can generally be reduced by giving up some reliability of detection. The less time the sensor has to make a detection decision, the less reliable the decision will be.

Photoelectric sensors have an inherent uncertainty in the signal transition time, typically referred to in the art as repeatability, and also typically of the order of hundreds of microseconds. This translates to uncertainty in the location of the object at the signal time, where the uncertainty is proportional to object velocity.

The combination of physical positioning, latency, and repeatability limit the accuracy of a photoelectric sensor in locating objects.

Recently a new class of optoelectronic sensors have been developed, described in pending U.S. patent application Ser. No. 10/865,155 filed Jun. 9, 2004. These sensors, called therein vision detectors, address some of the limitations of photoelectric sensors. A vision detector uses a two-dimensional imager (similar to those used in digital cameras) connected to a computer or like device that analyzes the digital images to make detection and location decisions.

Vision detectors provide an ability to distinguish desired objects from other conditions that far surpasses that which can be achieved with photoelectric sensors. This ability is achieved by using two-dimensional brightness patterns to detect and locate objects. Establishing a reference point can be done electronically by means of a human-machine interface. These devices, however, exhibit significant latency, on the order of several milliseconds, and repeatability that, even under favorable conditions, is no better than that of photoelectric sensors.

Vision detectors, furthermore, are very expensive compared to photoelectric sensors, and far more complex to set up for a given application.

SUMMARY OF THE INVENTION

The invention provides optoelectronic methods and systems for detecting moving objects and providing information describing the objects, including but not limited to the location of the objects. The disclosed methods and systems provide embodiments offering some or all of the following benefits:

advanced ability to distinguish desired objects from other conditions, based on measurements made in one-dimensional images, including embodiments that use normalized correlation pattern detection methods and processes;

electronic setting and adjustment of a reference point using a human-machine interface;

no latency, or even negative latency, optionally adjustable using a human-machine interface and based on predicting a time at which an object will cross a reference point;

very high repeatability, based on very high image capture and analysis rates and precise methods for determining object position;

relatively low cost;

relatively easy to set up and test; and other advantages described herein or that will be apparent to one of ordinary skill in the art.

Objects to be detected and/or located are in motion relative to the field of view of an optical sensor, which makes light measurements in that field of view. One-dimensional images oriented approximately parallel to the direction of motion are captured and analyzed to produce information describing the objects, and the information may be used for any purpose, including communicating to other systems using a signal. In typical embodiments, the optical sensor is a linear optical sensor comprising a one-dimensional array of photoreceptors.

As used herein the term downstream means "in the direction of motion", and the term upstream means "opposite the direction of motion".

The use of one-dimensional images orientated approximately parallel to the direction of motion provides significant and unanticipated advantages over prior art systems that use emitter/receiver configurations, two-dimensional imagers, or one-dimensional images in other orientations. The object motion combined with the image orientation provide a time-sequence of one-dimensional images of a slice of an object as it enters, moves within, and/or exits the field of view. The object motion insures that at least a portion of the captured images correspond to a plurality of positions of the object relative to the field of view. This provides, among other benefits, a plurality of viewing perspectives, giving far more information about the object than can be obtained from a single perspective. The use of images obtained from multiple viewpoints contributes to the ability to reliably distinguish desired objects from other conditions, and to track object motion so as to provide highly repeatable location information with no latency. Embodiments comprising a linear optical sensor and a digital processor powerful enough to handle one-dimensional images are very inexpensive.

By contrast a prior art emitter/receiver configuration is essentially a zero-dimensional sensor that only measures how much light is being received. There is no ability to distinguish desired objects by, for example, pattern detection methods, and no ability to visually track objects passing through a field of view to improve detection reliability or provide more accurate location information.

Use of one-dimensional images permits a much higher capture and analysis rate, at lower cost, than prior art systems that use two-dimensional images for detection and location. An illustrative vision detector described in pending U.S. patent application Ser. No. 10/865,155, for example, operates at 500 images per second. An illustrative embodiment of the present invention, described below, operates at over 8000 images per second, and at far lower cost. This high operating rate combined with the processes described herein allows latency to be eliminated and repeatability to be dramatically improved. The above-referenced patent application does not describe or contemplate that one-dimensional images oriented approximately parallel to the direction of motion could be used for the purposes described herein, or that latency could be eliminated by any means.

It has long been known in the prior art to image moving objects using linear array sensors oriented approximately perpendicular to the direction of motion. One purpose of such a configuration is to obtain a two-dimensional image of an object from a single viewpoint, not a time-sequence of a slice of the object in multiple positions. Such a linear array, oriented approximately perpendicular to the direction of motion, is simply an alternative to a two-dimensional camera that has certain advantages and disadvantages compared to such a camera. It is not suitable for the purposes described herein. Other uses of linear array sensors oriented approximately perpendicular to the direction of motion are known, but likewise are not suitable for the purposes described herein.

The methods and systems herein disclosed capture one-dimensional images of a field of view through which objects may be moving, and analyze at least a portion of the images to provide information describing the objects.

In some embodiments, the information describing the object comprises knowledge responsive to object presence in the field of view, for example knowledge that an object is in the field of view or crosses a reference point.

In some embodiments, the information describing the object comprises an estimate of a time at which the object crosses a reference point, called herein a reference time. These embodiments allow the object to be located—the object is located at the reference point at the reference time, an estimate of which is provided by the information describing the object.

Some embodiments provide an electronic human-machine interface that allows the reference point to be adjusted, for example by providing pushbuttons to move the reference point upstream or downstream. This allows the reference point to be set very precisely, and without physically moving the sensor.

Some embodiments provide a signal that serves to locate the object by indicating the estimate of the reference time. The indication can be made in a variety of ways well-known in the art, and further described below; in some embodiments the signal indicates the estimated time simply by occurring at that time, or responsive to that time, for example delayed or advanced by some amount. In such embodiments the time that the signal occurs is referred to herein as a signal time. A human-machine interface can also be provided to allow adjustment of the signal time relative to the estimated time.

In some embodiments, there is no latency between the actual reference time and the signal time. In some embodiments, the estimate of the reference time is determined by predicting the reference time.

Some embodiments provide an example object and a setup signal for setting the reference point. The example object is placed at the desired reference point, and the setup signal indicates that it is so placed. In response to the setup signal, one or more images of the field of view containing the example object are captured and analyzed to set the reference point. This allows the sensor to be installed in an approximate location, and then have the reference point set precisely without physically moving the sensor. The setup signal can come from a human-machine interface, from other equipment, from software subroutine calls, or from any means known in the art. In such embodiments, a signal can be produced at a time when the object crosses the reference point (no latency), is upstream from the reference point (negative latency), or is downstream from the reference point (positive latency).

Some embodiments employ a test object and a human-machine interface that permit an installation of the sensor to be tested. Suitable indictors tell if the test object is detected in the field of view, and if so whether it is upstream or downstream from the reference point.

In some embodiments, the methods and systems make measurements in at least a plurality of the captured images, select from those measurements those judged responsive to an object in the field of view, use the selected measurements to make decisions that produce information describing an object, and optionally produce signals that communicate that information.

In such embodiments, image measurements are made for captured images, where the image measurements comprise any suitable computation on the image. Examples of image measurements include brightness, contrast, edge quality, peak correlation value, peak correlation position, and many others well-known in the art.

A set of object measurements are selected from among the image measurements, wherein the object measurements comprise image measurements that are judged responsive to an object in the field of view. Some or all of the image measurements are used to select the object measurements, so that the judgment is made not blindly but based on conditions in the field of view. An image measurement particularly suited to such a judgment is peak correlation value using a model pattern and a normalized correlation process, although many other kinds of measurements can also be used within the scope of the invention.

Object measurements are used to make decisions that produce information describing an object. Information may describe presence or states of being present, events such as an object crossing a reference point, location, velocity, brightness, contrast, and many others that will occur to one of ordinary skill that can be obtained according to the methods and systems of the invention.

In an illustrative embodiment, accurate location information with no latency is obtained by predicting the time at which an object will cross a reference point, and scheduling a signal to occur at the predicted time. The prediction is obtained by fitting a curve, for example a line, through a set of (time, position) points, where the times correspond to times at which images were captured and the positions are obtained from image measurements.

In an illustrative embodiment, latency can be adjusted using a human-machine interface, and even made negative, a novel capability.

In an illustrative embodiment the reference point can be set and adjusted precisely using a human-machine interface.

In an illustrative embodiment, a model pattern used in a normalized correlation process for producing certain image measurements can be obtained with a training process that uses an example object to indicate the desired appearance of objects to be detected and located.

BRIEF DESCRIPTION OF THE DRAWINGS

The invention will be understood from the following detailed description, along with the accompanying figures, wherein.

DETAILED DESCRIPTION OF THE INVENTION

In the following detailed description of the illustrative embodiments, reference is made to the accompanying drawings which form a part hereof, and in which are shown by way of illustration specific embodiments in which the invention may be practiced. It is to be understood that other embodiments may be utilized and structural changes may be made without departing from the scope of the invention.

Some Definitions

As used herein the term linear detector refers to an optoelectronic system according to an embodiment of the invention, for purposes of providing information describing objects, herein equivalently referred to as object information. Similarly, the term linear detection method refers to a method according to an embodiment of the invention for like purposes.

Applications of a linear detector include but are not limited to analysis, detection, and location of objects. In an illustrative embodiment intended for object detection, the object information comprises knowledge that an object has been detected in a certain state, for example crossing a reference point. In an illustrative embodiment intended for object location, the object information comprises the time when an object crosses a fixed reference point.

As used herein a process refers to systematic set of actions directed to some purpose, carried out by any suitable apparatus, including but not limited to a mechanism, device, component, software, or firmware, or any combination thereof that work together in one location or a variety of locations to carry out the intended actions. A system according to the invention may include suitable processes, in addition to other elements.

The description herein generally describes embodiments of systems according to the invention, wherein such systems comprise various processes and other elements. It will be understood by one of ordinary skill in the art that descriptions can easily be understood to describe methods according to the invention, where the processes and other elements that comprise the systems would correspond to steps in the methods.

Example Applications

Figure 1:
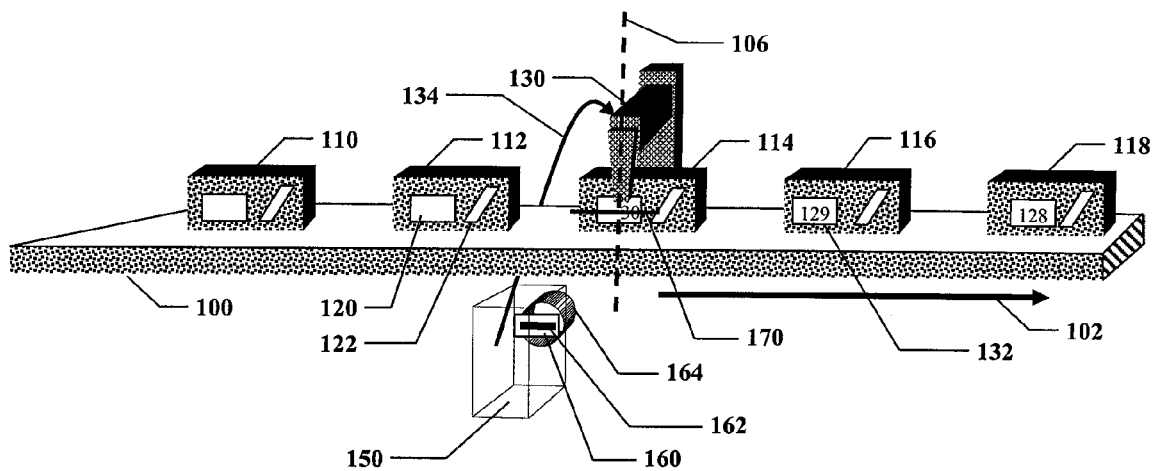
FIG. 1 shows an example application of a system according to the invention for detecting and locating discrete objects moving down a production line.

FIG. 1 illustrates an example application of an illustrative embodiment of the invention to detect and locate objects. Conveyer 100 moves boxes 110, 112, 114, 116, and 118 in direction of motion 102. Each box in this example includes a label, such as example label 120, and a decorative marking, such as example marking 122. A printer 130 prints characters, such as example characters 132, on each label as it passes by. In the example of FIG. 1, the labels are the objects to be detected and located.

The illustrated linear detector 150 provides signal 134 to printer 130 at times when labels to be printed pass, or are in some desirable position relative to, reference point 106. In an illustrative embodiment signal 134 comprises a pulse indicating that a label has been detected, and wherein the leading edge of the pulse occurs at the time that a label is at reference point 106 and thereby serves to locate the label.

Linear detector 150 uses lens 164 to form a one-dimensional image of field of view 170 on linear optical sensor 160 comprising linear array of photoreceptors 162. Field of view 170 and linear array of photoreceptors 162 are oriented so as to produce one-dimensional images oriented approximately parallel to the direction of motion. Each photoreceptor makes a light measurement in the field of view.

In the example of FIG. 1, certain features of the boxes make the use of prior art photoelectric sensors to detect and locate the labels unsuitable. Photoelectric sensors are generally well-suited to detect the edges of the boxes, but the labels are not in a fixed position relative to the box edges. For example, the label on box 118 is farther away from the left edge than the label on box 116. It is desirable, therefore, to detect the label itself, but the edge of the label is indistinguishable from the edge of the decorative marking, making prior art photoelectric sensors unsuitable.

The labels are much wider than the decorative markings, however, and the light pattern corresponding to a label in field of view 170 can be distinguished from the light pattern corresponding to a decorative marking by appropriate analysis of the one-dimensional images, for example by using a pattern detection process. The invention analyzes the images to provide reliable detection and accurate location, as further described below.

Figure 2:
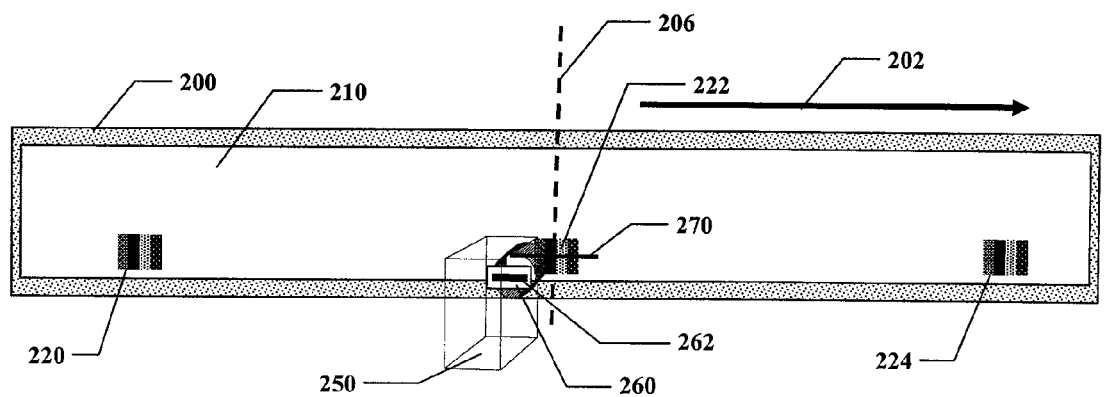
FIG. 2 shows an example application of a system according to the invention for detecting and locating markings on a moving continuous web.

FIG. 2 illustrates another example application of the invention to detect and locate objects. Conveyer 200 moves continuous web 210 in direction of motion 202. Web 210 contains periodic reference marks, such as example marks 220, 222, and 224. The marks move through field of view 270 of linear detector 250 comprising linear optical sensor 260 on which one-dimensional images of field of view 270 are focused. Linear optical sensor 260 comprises linear array of photoreceptors 262. Field of view 270 and linear array of photoreceptors 262 are oriented so as to produce one-dimensional images oriented approximately parallel to direction of motion 202.

Linear detector 250 may provide a signal (not shown) to suitable automation equipment (not shown) at times when a reference mark crosses, or is in some desirable position relative to, reference point 206.

In the example of FIG. 2, reference marks comprise a pattern of shades of gray that can be distinguished from other marks, features, defects, or shading that might appear on web 210, providing detection that is significantly more reliable than could be achieved by prior art photoelectric sensors.

Illustrative Apparatus

Figure 3:
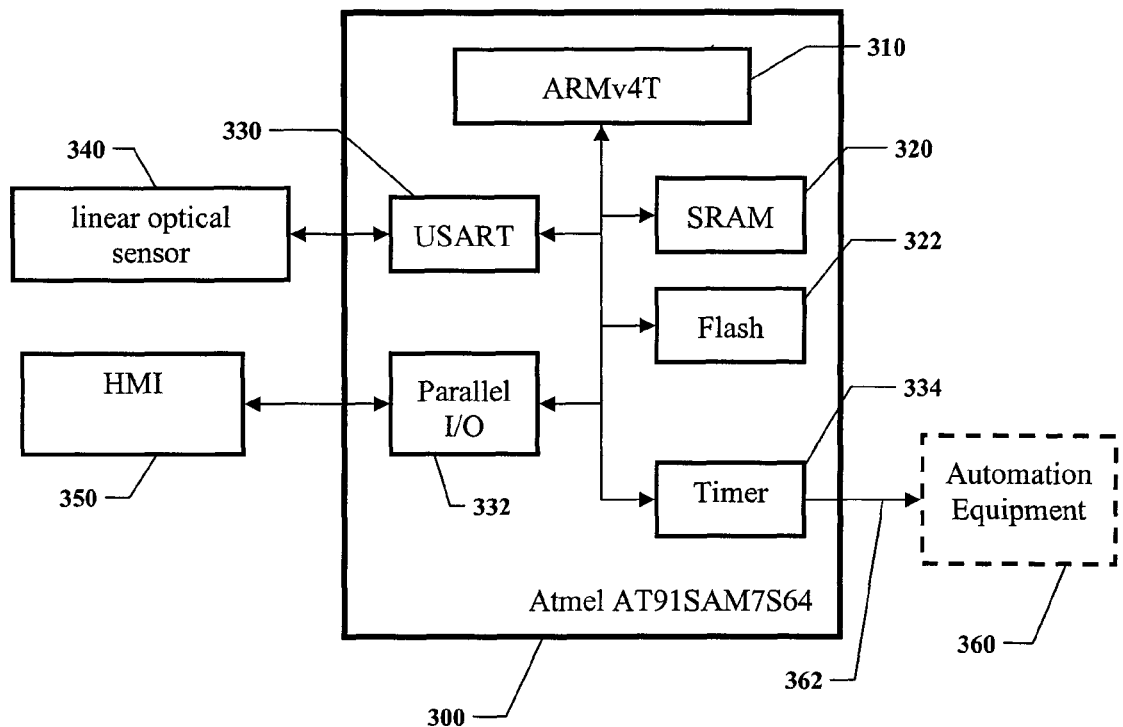
FIG. 3 shows a block diagram of an illustrative apparatus.

FIG. 3 is a block diagram of an illustrative embodiment of a portion of a linear detector according to the invention. Microcontroller 300, such as the AT91SAM7S64 sold by Atmel Corporation of San Jose, Calif., comprises ARMv4T processor 310, read/write SRAM memory 320, read-only flash memory 322, universal synchronous/asynchronous receiver transmitter (USART) 330, parallel I/O interface (PIO) 332, and timer 334. ARMv4T processor 310 controls the other elements of microcontroller 300 and executes software instructions stored in either SRAM 320 or flash 322 for a variety of purposes. SRAM 320 holds data used by ARMv4T processor 310. Microcontroller 300 operates at a clock frequency of 50 MHz.

Linear optical sensor 340, such as the TSL3301-LF sold by Texas Advanced Optoelectronic Solutions (TAOS) of Plano, Tex., comprises a linear array of 102 photoreceptors. Linear optical sensor 340, under control of ARMv4T processor 310 by commands issued using USART 330, can expose the linear array of photoreceptors to light for an adjustable period of time called the exposure interval, and can digitize the resulting 102 light measurements and transmit them in digital form to USART 330 for storage in SARM 320. Linear optical sensor 340, also under control of ARMv4T processor 310, can apply an adjustable analog gain and offset to the light measurements of each of three zones before being digitized, as described in TAOS document TAOS0078, January 2006.

In an illustrative embodiment, linear optical sensor 340 is calibrated to compensate for any non-uniformity of illumination, optics, and response of the individual photoreceptors. A uniformly white object is placed in the FOV, and the gain for each of the three zones is set so that the brightest pixels are just below saturation. Then a calibration value is computed for each pixel, such that when each gray level is multiplied by the corresponding calibration value, a uniform image is produced for the uniformly white object. The calibration values are stored in flash 322 and applied to subsequent captured images. The calibration values are limited such that each gray level is multiplied by no more than 8. Each image used by the calibration procedure is obtained by averaging 512 captured images.

Any suitable means can be employed to illuminate the FOV of linear optical sensor 340. In an illustrative embodiment, two 630 nm LEDs are aimed at the FOV from one side of linear optical sensor 340, and two 516 nm LEDs are aimed at the FOV from the other side. A light-shaping diffuser, such as those manufactured by Luminit of Torrance, Calif., is placed in front of the LEDs so that their beams are spread out parallel to linear optical sensor 340.

Human users of a linear detector, such as manufacturing technicians, can control the system by means of human-machine interface (HMI) 350. In an illustrative embodiment, HMI 350 comprises an arrangement of buttons and indicator lights as further described below. ARMv4T processor 310 controls HMI 350 using PIO interface 332. In other embodiments, an HMI consists of a personal computer or like device; in still other embodiments, no HMI is used.

The linear detector illustrated in FIG. 3 produces signal 362 for purposes including indicating detection and location of objects. Signal 362 is connected to automation equipment 360 as required by a given application. Signal 362 is generated by timer 334 under control of ARMv4T processor 310. In an alternative embodiment, signal 362 is generated by PIO interface 332, also under control of ARMv4T processor 310. Note that automation equipment 360 is shown for illustrative purposes only; signal 362 may be used for any purpose and need not be connected to any form of automation equipment, and signal 362 need not be used at all.

In an illustrative embodiment, various processes are carried out by an interacting collection of digital hardware elements, including those shown in the block diagram of FIG. 3, suitable software instructions residing in SRAM 320 or flash 322, and data residing in SRAM 320.

Processes Employed by Various Embodiments of a System According to the Invention As used herein a motion process provides relative motion between the objects and the field of view of an optical sensor, in some direction of motion. The objects, the sensor, and/or the field of view can be moving, as long as there is relative motion. Example motion processes include, but are not limited to: a conveyer moving objects past a fixed or moving sensor; a sensor attached to a robot arm that moves the sensor past fixed or moving objects; a fixed object and a fixed sensor that uses some means, for example a moving mirror, to move the field of view; and objects in freefall that pass a fixed or moving sensor.

As used herein a capture process obtains one-dimensional images of the field of view of an optical sensor that makes light measurements. The images may be in any form that conveys information about light emerging from the field of view and is suitable for analysis by other processes as required. The images may be responsive to light of any color, any wavelength or range of wavelengths, any state of polarization, or any other light characteristic or combination thereof that can be measured. The images may be analog, digital, or any combination; may reside in the optical sensor, in memory external to the sensor, or any combination; and may be obtained by any suitable form of analog and/or digital signal processing, including but not limited to gain and offset, resampling, change in resolution, time filtering, and/or spatial filtering.

In the illustrative apparatus of FIG. 3, the capture process comprises digitizing the light measurements so as to obtain an array of numbers, called pixels, whose values, called gray levels, correspond to the light measurements; transferring the pixels from linear optical sensor 340 to microcontroller 300; and storing the pixels into SRAM memory 320 for subsequent analysis. Following the usual convention in the art, a pixel may refer either to an element of the array of numbers, or to a unit of distance corresponding to the distance between two adjacent elements of the array. The array of pixels is a one-dimensional digital image.

The capture process operates cooperatively with the motion process so as to capture a plurality of one-dimensional images oriented approximately parallel to the direction of motion. This insures that at least a portion of the images will correspond to a plurality of positions of an object relative to the field of view, providing a time-sequence of images of a slice of the object as it passes through the field of view.

It will be apparent to one skilled in the art that "approximately parallel" refers to any orientation that allows the linear detector to obtain a time-sequence of images of a slice of an object in a plurality of positions as it enters, moves within, and/or exits the field of view. It will further be apparent that the range of orientations suitable for use for with the systems and methods described herein has a limit that depends on a particular application of the invention. For example, if the orientation of the image is such that the angle between the image orientation and the direction of motion is 5 degrees, the object will drift 0.09 pixels perpendicular to the direction of motion for every pixel it moves parallel to that direction. If the range of the plurality of positions covers 30 pixels in the direction of motion, for example, the drift will be only 2.6 pixels. If the systems and methods described herein function as intended with a 2.6 pixel drift in a given application of the invention, the example 5 degree orientation would be approximately parallel for that application. Clearly, whether the systems and methods described herein function as intended depends on the nature of the object, the desired performance of the invention (for example accuracy and reliability), and other factors.

Similarly, it will be apparent to one skilled in the art that the direction of motion need not be exactly uniform or consistent, as long as the systems and methods described herein function as intended.

The use of one-dimensional images allows very high capture and analysis rates at very low cost compared to prior art two-dimensional systems. The high capture and analysis rate allows many images of each object to be analyzed as it passes through the field of view. The object motion ensures that the image are obtained from a plurality viewing perspectives, giving far more information about the object than can be obtained from a single perspective. This information provides a basis for reliable detection and accurate location.

Prior art linear array sensors oriented approximately perpendicular to the direction of motion generally produce a single two-dimensional image of each object. Such systems are useful but do not provide the capabilities of the present invention.

While the illustrative embodiments of FIGS. 1, 2, and 3 use linear optical sensors to produce one-dimensional images oriented approximately parallel to the direction of motion, it will be apparent to one skilled in the art that other types of optical sensors can also be used for like purposes. For example, a two-dimensional optical sensor can be used to capture two-dimensional images, portions of which are then converted to one-dimensional images oriented approximately parallel to the direction of motion. The conversion can be accomplished by any suitable form of signal processing, for example by averaging light measurements approximately perpendicular to the direction of motion. As another example, a two-dimensional optical sensor capable of capturing so-called regions of interest can be used. Many commercially available CMOS optical sensors have this capability. A one-dimensional region of interest oriented approximately parallel to the direction of motion would be functionally equivalent to a linear optical sensor. The image portion or region of interest need not be the same for each captured image, but can be moved in any manner as long as the systems and methods described herein function as intended.

Figure 4:
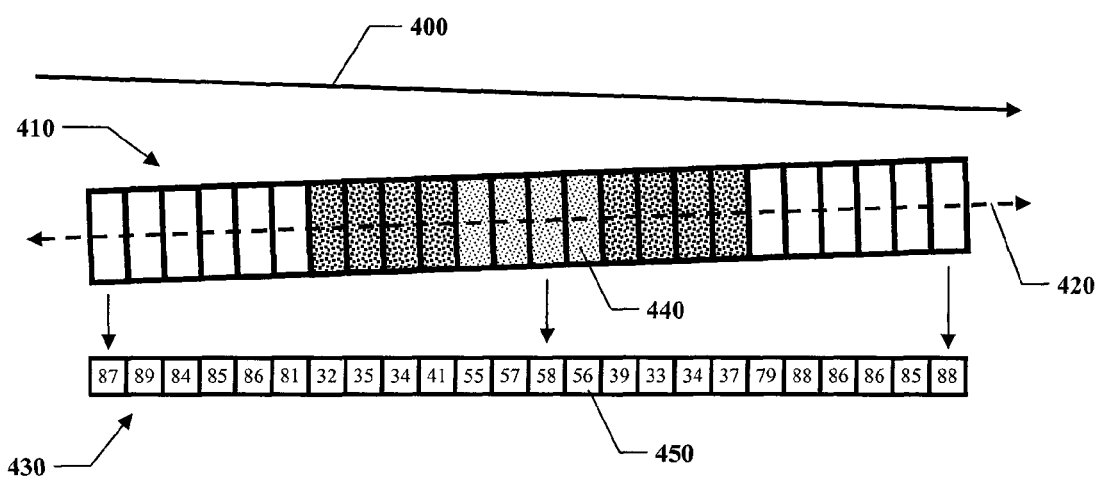
FIG. 4 shows a portion of a capture process that obtains an image of a field of view, where the image is oriented approximately parallel to a direction of motion.

FIG. 4 shows a portion of an illustrative capture process that obtains one-dimensional image 430 of field of view 410, where image 430 is oriented approximately parallel to direction of motion 400.

Light emitted from field of view 410 is focused onto an optical sensor (not shown), which makes light measurements. In the illustrative capture process of FIG. 4, 24 discrete light measurements are made in 24 zones of field of view 410, such as example zone 440. The zones are shown as rectangular, contiguous, and non-overlapping for ease of illustration, but for typical sensors the geometry is more complex, due in part to the nature of the optics used to focus the light and the requirements of semiconductor fabrication.

In the illustrative capture process of FIG. 4, each light measurement is digitized to produce 24 pixels, such as example pixel 450, which corresponds to example zone 440. The gray level of example pixel 450 is 56, which is the light measurement for example zone 440.

The zones of FIG. 4 may correspond, for example, to individual photoreceptors in a linear array sensor, or to a plurality of photoreceptors of a two-dimensional sensor that have been converted to a single measurement by any suitable form of signal processing, as described above.

The geometry of the light measurement zones of field of view 410 define image orientation 420 of image 430. Image 430 is oriented approximately parallel to direction of motion 400 if image orientation 420 and direction of motion 400 are such that the capture process can obtain a time-sequence of images of a slice of an object in a plurality of positions as it enters, moves within, and/or exits the field of view. Note that image orientation 420 is a direction relative to field of view 410, as defined by the geometry of light measurements contained in image 430. The image itself is just an array of numbers residing in a digital memory; there is no significance to its horizontal orientation in FIG. 4.

As used herein a measurement process makes measurements in the field of view by analyzing captured images and producing values called image measurements. Example image measurements include brightness, contrast, edge quality, edge position, number of edges, peak correlation value, and peak correlation position. Many other image measurements are known in the art that can be used within the scope of the invention. Image measurements may be obtained by any suitable form of analog and/or digital signal processing.

In the illustrative embodiment of FIG. 3, a measurement process comprises a digital computation carried out by ARMv4T processor 310, operating on a captured image stored in SARM 320, under the control of software instructions stored in either SRAM 320 or flash 322. For example, a brightness image measurement may be made by computing the average of the pixels of an image or portion thereof; a contrast image measurement may be made by computing the standard deviation of the pixels of an image or portion thereof.

It is not necessary that the same image measurements be made in every captured image, or that the same number of image measurements be made. An embodiment of the invention may be such that for certain captured images no analysis is done and therefore no image measurements are made, but for clarity of description we ignore such images and assume that all captured images are analyzed by a measurement process.

In some applications of the invention there will be captured images for which no object is in the field of view, and therefore the image measurements tell nothing about an object. In other applications an object is always in the field of view, but not all image measurements are relevant for determining object information. It may also be that all image measurements are relevant, but at various points some object information must be determined so a signal can be produced. Therefore, a linear detector according to some embodiments of the invention includes a selection process whose purpose is to select from among the image measurements those that are judged responsive to the object. Image measurements that are selected are called object measurements. The selection process uses at least a portion of the image measurements to decide which ones to select, as will be described in more detail below.

In the illustrative embodiment of FIG. 3, a selection process comprises a digital computation carried out by ARMv4T processor 310, operating on image measurements stored in SARM 320 or in the registers of ARMv4T processor 310, under the control of software instructions stored in either SRAM 320 or flash 322.

A linear detector according to the invention may include a decision process whose purpose is to analyze object measurements so as to produce object information. In the illustrative embodiment of FIG. 3, a decision process comprises a digital computation carried out by ARMv4T processor 310, operating on object measurements stored in SARM 320 or in the registers of ARMv4T processor 310, under the control of software instructions stored in either SRAM 320 or flash 322.

A linear detector according to some embodiments of the invention may optionally include a signaling process whose purpose is to produce a signal that communicates object information. A signal can take any form known in the art, including but not limited to an electrical pulse, an analog voltage or current, data transmitted on a serial, USB, or Ethernet line, radio or light transmission, and messages sent or function calls to software routines. The signal may be produced autonomously by the linear detector, or may be produced in response to a request from other equipment.

In the illustrative embodiment of FIG. 3, a signaling process comprises a digital computation carried out by ARMv4T processor 310, operating on object information stored in SARM 320 or in the registers of ARMv4T processor 310, producing signal 362 by means of timer 334, and under the control of software instructions stored in either SRAM 320 or flash 322. Signal 362 is an electrical pulse, and timer 334 is used by ARMv4T processor 310 to insure that the pulse appears at a precise time.

It should be clear that any combination of processes that interact in any way is also a process. Thus the description of various embodiments as comprising various specific processes is made for convenience and ease of comprehension only. Any rearrangement of an embodiment into more or fewer processes that combine to carry out an equivalent set of actions directed to an equivalent purpose shall be understood to constitute an equivalent embodiment.

Overview of a Measurement Process

Often it is desirable to make an image measurement that is responsive to object presence in the field of view, so that a selection process can use that measurement to select object measurements judged responsive to an object. More specifically, the measurement process would compute a value (or set of values), called herein score measurements, indicative of the likelihood or level of confidence that an object is present; for example, higher values mean more likely or more confident. Image measurements made from a given image can be selected when the level of confidence that an object is present is judged to be sufficient according to some criteria, although certain image measurements might also be selected unconditionally or according to some other criteria.

Many kinds of image measurements are suitable for determining a confidence level that an object is present, and the choice of which to use depends on the application for which a linear detector is intended. Image measurements including brightness, contrast, edge quality, number of edges, and peak correlation value can be used, as well as many others that will occur to a person of ordinary skill in the art.

Often it is desirable to make an image measurement that is responsive to object position in the field of view. Such a measurement is called herein a position measurement. A selection process can use such a measurement, as will be seen below in the description of FIG. 11. A decision process can use such a measurement to locate an object. Many kinds of image measurements suitable for estimating object position are known in the art; an illustrative embodiment is described below.

Of particular interest are measurement processes that incorporate a pattern detection process. A pattern detection process is one that is responsive to the spatial arrangement of gray levels in an image. For example a brightness measurement made by computing an average of pixels, or a contrast measurement made by computing the standard deviation of pixels, are not pattern detection processes because the results are independent of the spatial arrangement of the gray levels. Examples of pattern detection processes include edge detection and correlation; many others are well-known in the art.

Measurement Process for an Illustrative Embodiment

Figure 5:
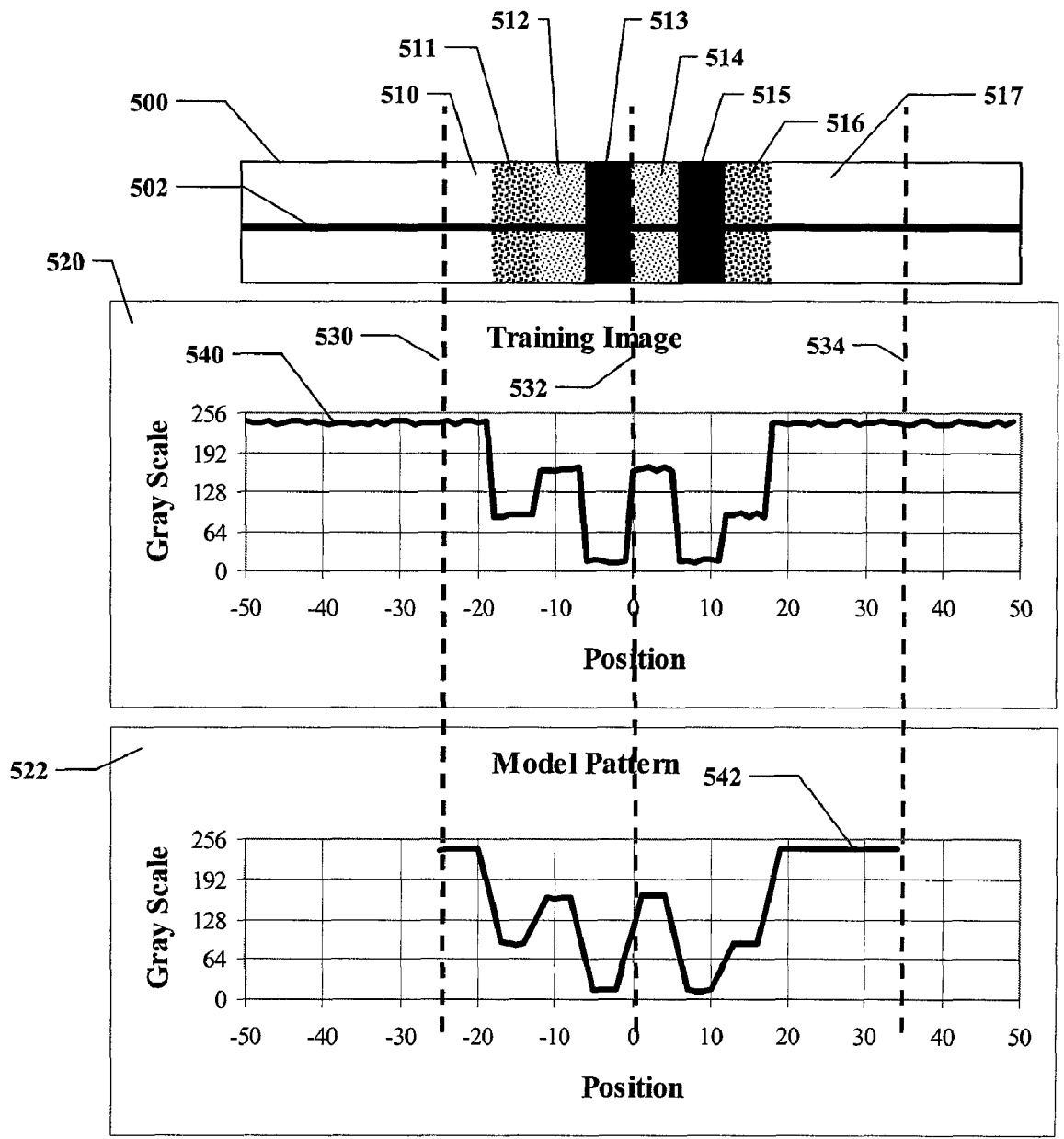
FIG. 5 shows a portion of a training process used to obtain a model pattern for use in a measurement process of an illustrative embodiment.
Figure 6:
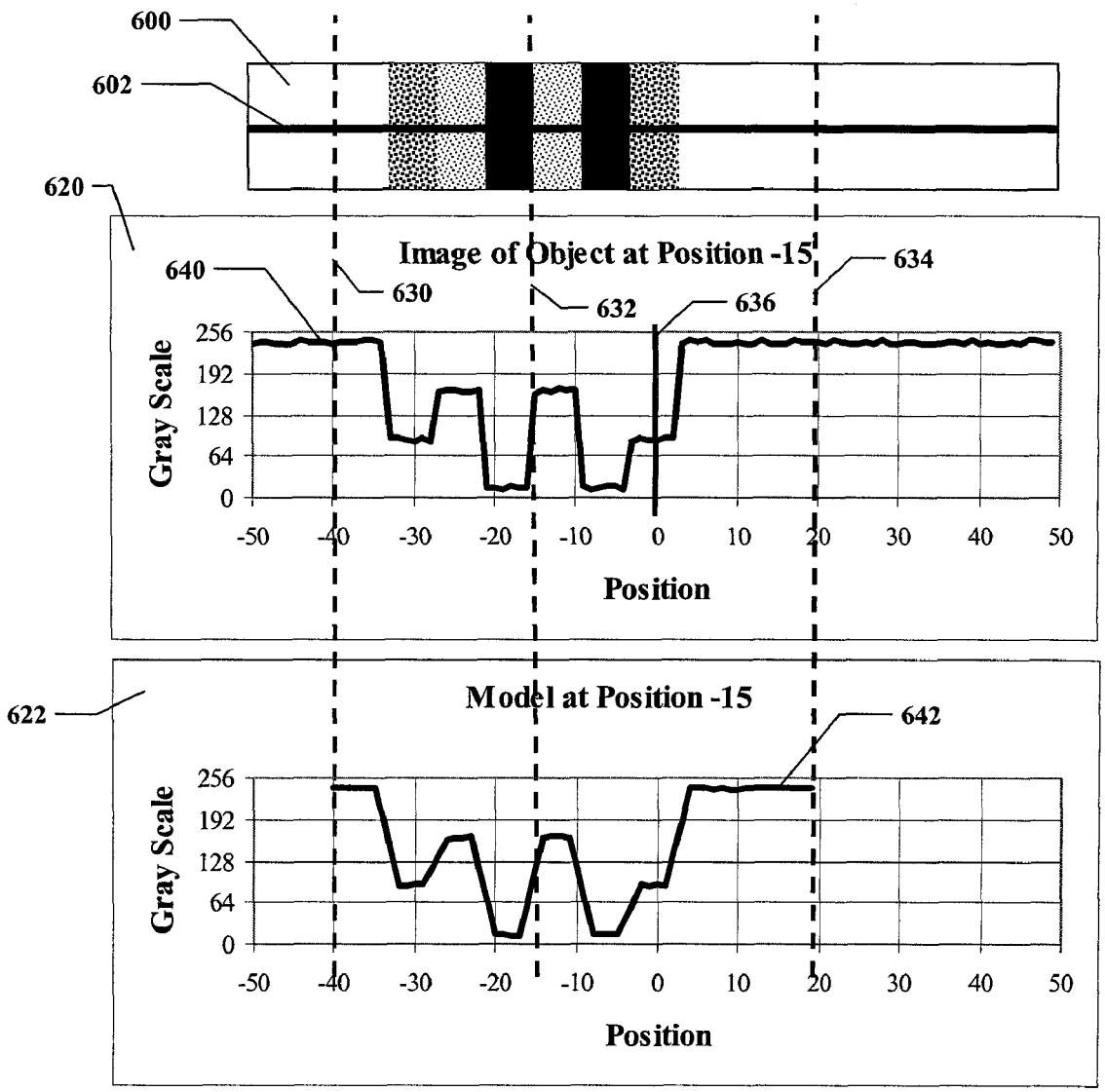
FIG. 6 shows an object located at a certain position as part of a measurement process of an illustrative embodiment.

FIGS. 5 and 6 illustrate image measurements that are responsive to object presence and object position, as produced by a measurement process used by an illustrative embodiment. The measurement process incorporates a normalized correlation process based on the well-known normalized correlation operation. A normalized correlation process is an example of a pattern detection process, and uses a model pattern that corresponds to an expected pattern of gray levels in an image of an object in the field of view. It searches for the position in a captured image that is most similar to the model pattern, producing image measurements including the degree of similarity at that position, which is an example of a score measurement, and the position itself, which is an example of a position measurement. Note that if there is no position in a captured image that is sufficiently similar, the position measurement may be meaningless. Normalized correlation provides numerous benefits that are well-known in the art.

The score measurement is responsive to object presence, and the position measurement is responsive to object position. In an illustrative embodiment, the score measurement is $\min(r, 0)^2$, where r is the normalized correlation coefficient, and the position measurement provides sub-pixel accuracy using the well-known parabolic interpolation method.

A model pattern can comprise any pattern of gray levels, including a simple edge pattern consisting of two gray levels or a complex pattern containing many gray levels. It can be obtained in a variety of ways, including from prior knowledge of the expected pattern of gray levels, and from an example object using a training process.

FIG. 5 illustrates obtaining a model pattern using a training process in an illustrative embodiment. An example object 500 is placed in field of view 502. The example object comprises a light pattern including bright regions 510 and 517, dark regions 513 and 515, medium-bright regions 512 and 514, and medium-dark regions 511 and 516.

The training process captures one-dimensional training image 540 from example object 500. The training image 540 is illustrated by graph 520, which plots gray level as a function of position in the image. The position of the pattern in the training image is arbitrarily defined to be at 0, as indicated by origin line 532, which in this example is also the reference point, passing through the boundary between region 513 and 514.

In the illustrative embodiment of FIG. 5, model pattern 542 is obtained from the portion of training image 540 that lies between first position 530 at −25 and second position 534 at +35. It can be seen that training image 540 is subject to some noise, and so model pattern 542 is obtained by averaging 512 captured images and then smoothing using a three-pixel wide boxcar filter. Any method known in the art can be used to obtain a model pattern from one or more training images, including no modification at all. One example of a well-known method uses multiple example objects and averages training images captured from each such object.

In the illustrative embodiment of FIG. 5, image 540 contains 100 pixels and model pattern 542 contains 60 pixels. In this embodiment the normalized correlation process looks for the peak position only where the model pattern lies entirely within the image, so there are 41 such positions. Various performance characteristics, such as speed, range, and discrimination, can be altered as needed by adjusting these sizes. Such adjustment can be carried out by HMI 350, by programming suitable values into the software, or by other well-known means. In another illustrative embodiment designed to operate at higher speeds but with smaller range and somewhat less discrimination, the image size is 84 pixels and the model pattern size is 54 pixels.

For embodiments along the lines of the foregoing discussion, a model should be at least 3 pixels and captured images should be at least as large as the model, but otherwise there are no limits to the image and model sizes. One skilled in the art will understand that different sizes represent different engineering tradeoffs among speed, range, discrimination, and other characteristics.

In the illustrative embodiment of FIG. 5 the direction of motion is left to right, i.e. in the direction of increasing positions. It can be seen that the portion of training image 540 that is used to obtain model pattern 542 has been offset downstream from the center of the field of view, in this example by 5 pixels. This allows model pattern 542 to fit completely within the 100-pixel image 540 in more positions between the upstream end and the reference point at origin line 532, providing more data for prediction as discussed below. In general the offset can be adjusted by HMI 350, by programming suitable values into the software, or by other well-known means. The offset can be calculated responsive to the location of the reference point and/or the desired latency, and need not be used at all.

FIG. 6 illustrates a measurement process making an image measurement responsive to object position using a normalized correlation process that is responsive to model pattern 542. Object 600, having a light pattern similar to that of example object 500, is at some position in field of view 602 at the time that image 640 is captured, as shown by graph 620.

Graph 622 shows model pattern 642 at the peak position, in this example at position −15. In this example, therefore, the measurement process makes an image measurement of object position in captured image 640, the image measurement being −15 pixels.

Since model pattern 642 is very similar to image 640 at the peak position, the score will be high and so the measurement process will make an image measurement of object presence that indicates high confidence that an object is present in the field of view at the time that image 640 is captured. Since the confidence is high, these two image measurements may be assumed to be responsive to the object, and can be selected to be included in the object measurements.

The foregoing description of a measurement process pertains to specific embodiments, and it is contemplated that significant modifications or entirely different methods and processes that occur to one skilled in the art can be used to achieve similar effects, or other desired effects in accordance with the teachings described herein. For example, all of the numerical constants used are understood to be examples and not limiting. A model can be obtained from prior knowledge of objects instead of from a training image. Well-known edge detection methods that use gradient instead of correlation and models can be used to provide score and position measurements, for example.

Latency and Prediction

Consider an object moving so as to cross a reference point at a reference time. A common way to design a sensor to detect and locate the object is to produce a signal, typically a pulse, at the precise time that the object crosses the reference point. The existence of the pulse serves to indicate that an object is detected, and the timing of the pulse serves to indicate its location by giving the time at which the object is located at the known reference point. Using the signal, desired automation equipment can act on the object when it is in a known location. It is important that the signal is produced when the object is present, and not produced at other times in response to whatever else may be happening in front of the sensor.

Of course in practice any system or method can only estimate the reference time, so there will be some error. The mean error, i.e. the average interval from the reference time to the signal time, is usually referred to in the art as latency or response time. Prior art devices exhibit some latency, typically of the order of hundreds or microseconds. The effect of latency is that the object has moved downstream from the reference point when the signal occurs, and by an amount that varies with the speed of motion. If the latency and speed are precisely known, automation equipment can be set up to act on the object in a known location. In practice, of course, latency and speed are known imprecisely, resulting in location errors that increase as speed or latency increases. An encoder or similar device can be used to compensate for poor knowledge of speed, but not latency.

The standard deviation of the errors is a measure of the repeatability of the system or method. These errors are random and cannot be compensated for. Overall accuracy combines the effects of latency and repeatability.

Latency results because it takes some time for a sensor to decide reliably that the object is present. Generally taking more time to make a decision results in more reliable decisions. A simple phototransistor could have an insignificant latency of a few nanoseconds, for example, but it would respond incorrectly to so many things that it would be useless. Prior art sensors make a tradeoff between acceptable latency and acceptable reliability.

Figure 7:
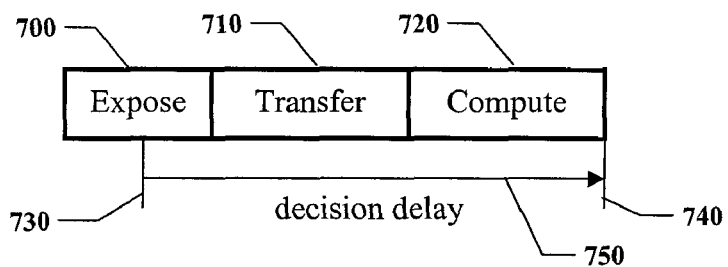
FIG. 7 shows a timing diagram that explains decision delay, for use in conjunction with the discussion of latency and prediction.

FIG. 7 shows this decision delay for the illustrative apparatus of FIG. 3. Image capture begins when linear optical sensor 340 exposes its photoreceptors to light for exposure interval 700. Under control of ARMv4T processor 310, pixels are transferred to SRAM 320. This transfer takes transfer interval 710. Measurement, selection, and decision processes then run on ARMv4T processor 310 over compute interval 720. The earliest any action (such as producing a signal) can be taken based on measurements in the image corresponding to exposure interval 700 is at decision point 740, which is delayed by decision delay 750 from the middle 730 of exposure interval 700. The decision process can only have knowledge of the past, not the present.

Note that in the illustrative apparatus of FIG. 3 the exposure, transfer, and compute intervals can all be overlapped, so the interval between images is only the largest of the three intervals, not their sum. This allows much higher time resolution, but does not in any way reduce decision delay 750.

While a decision delay is unavoidable, latency is not. The invention eliminates latency by predicting when the object will cross the reference point, and scheduling a signal to occur at that time. Prediction is accurate when there is sufficient knowledge of the motion of the object, both from measurements of how it has been moving and expectation that it will continue to do so for sufficient time in the future.

The invention also allows detection to be much more reliable than prior art systems even when the latency is zero or negative. Detection is based on many images, covering a span of time that can be many milliseconds long, allowing careful decision making without sacrificing latency. Furthermore, detection based on pattern detection including normalized correlation is fundamentally better able to distinguish the desired object from other things happening in the field of view.

By using a good prediction method, latency can also be made negative. In practice the range of negative latency that can be achieved is limited, but it provides new capabilities over the prior art that can be useful. If the automation equipment has a short latency between receiving the signal and acting, for example, a negative latency in a linear detector according to the invention can be used to offset the equipment latency so that the total system latency is zero.

Of course, no practical system or method can have a latency that is exactly zero; herein the term no latency will refer to systems or methods where the latency is significantly less than the repeatability. For such systems or methods, the signal will sometimes arrive before the reference time, and sometimes after.

Prediction in an Illustrative Embodiment

In an illustrative embodiment, a capture process captures images as previously described, and in addition produces a capture time (t) for each image, corresponding to the middle of the exposure time. For example, capture time can be determined by ARMv4T processor 310 by reading timer 334 at the middle of the exposure interval, or at some other point and correcting for the time difference between that point and the middle of the exposure interval.

Employing a measurement process using normalized correlation as described above, a set of score (s), position (x) pairs are obtained for an object moving through the field of view. Thus for each captured image we have three values (s, t, x); two image measurements from the measurement process and a capture time from the capture process. In this section we will consider (t, x) pairs only, ignore the selection process, and consider only that portion of the detection and signaling processes that pertains to prediction. Selection and detection will be further described in other sections below.

Prediction accuracy comes from several factors. For example, in the illustrative embodiment, a linear detector according to the invention operates at over 8000 images per second and assumes that motion is at constant velocity. Decision delay 750 is typically under 300 μs. High time resolution of about 125 μs allows accurate t measurements and many (t, x) pairs to be obtained for each object as it approaches the reference point. The short decision delay means that any deviations from constant speed occur over a very short interval. Use of normalized correlation with sub-pixel interpolation provide accurate x measurements.

Figure 8:
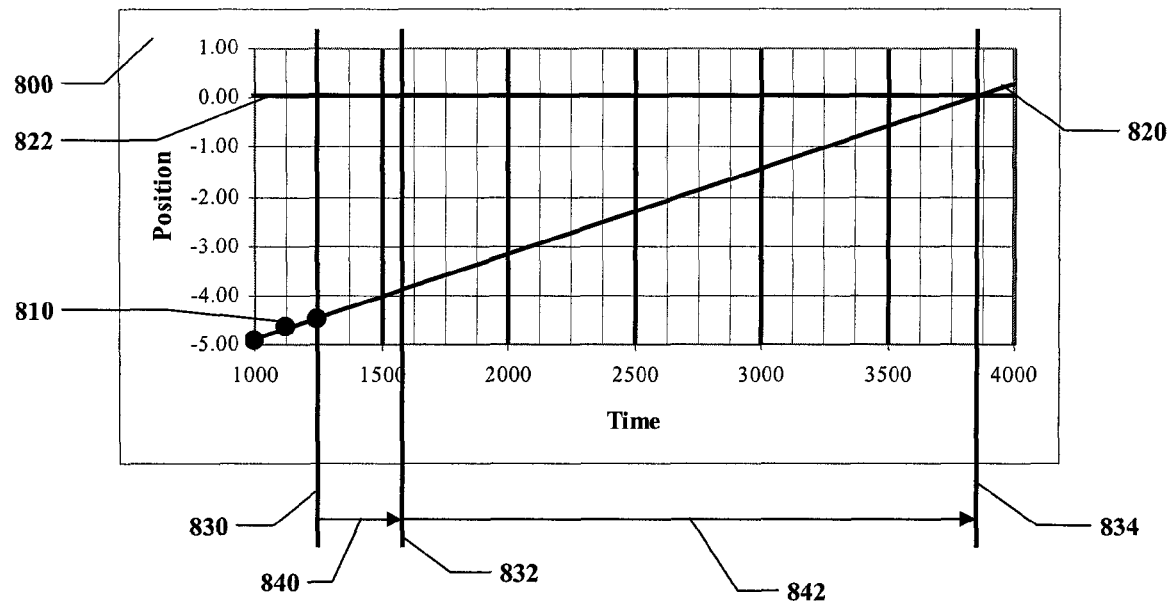
FIG. 8 shows a prediction of the time at which an object will cross a reference point, but with the crossing time too far in the future to schedule a signal.
Figure 9:
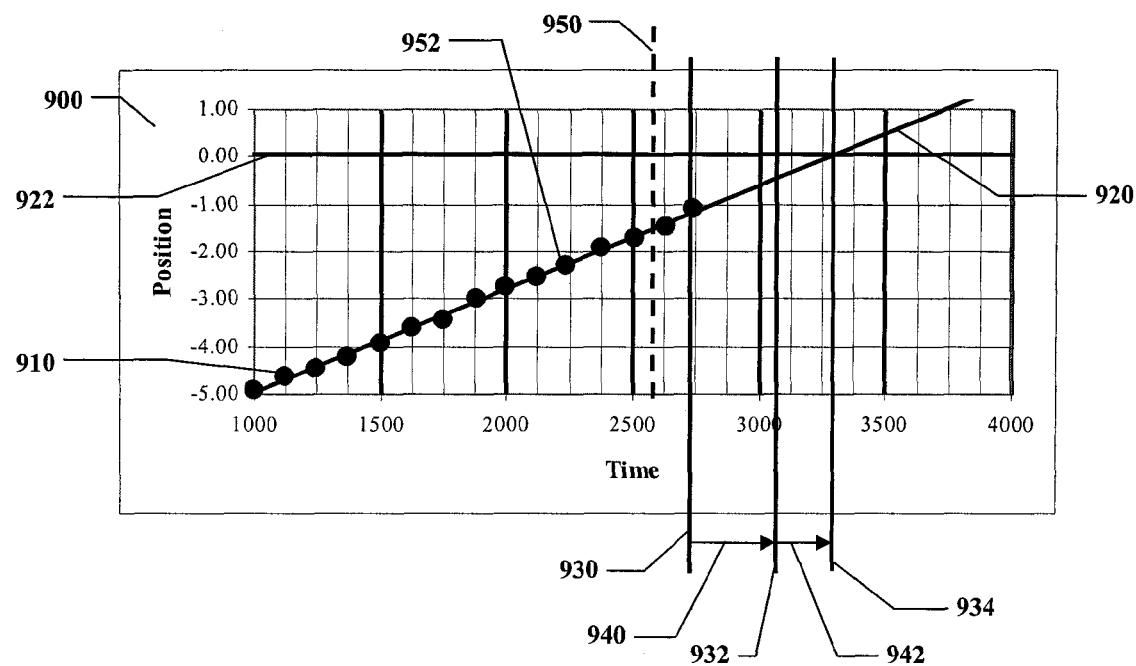
FIG. 9 shows a prediction of the time at which an object will cross a reference point, and the scheduling of a signal to occur at that time.
Figure 10:
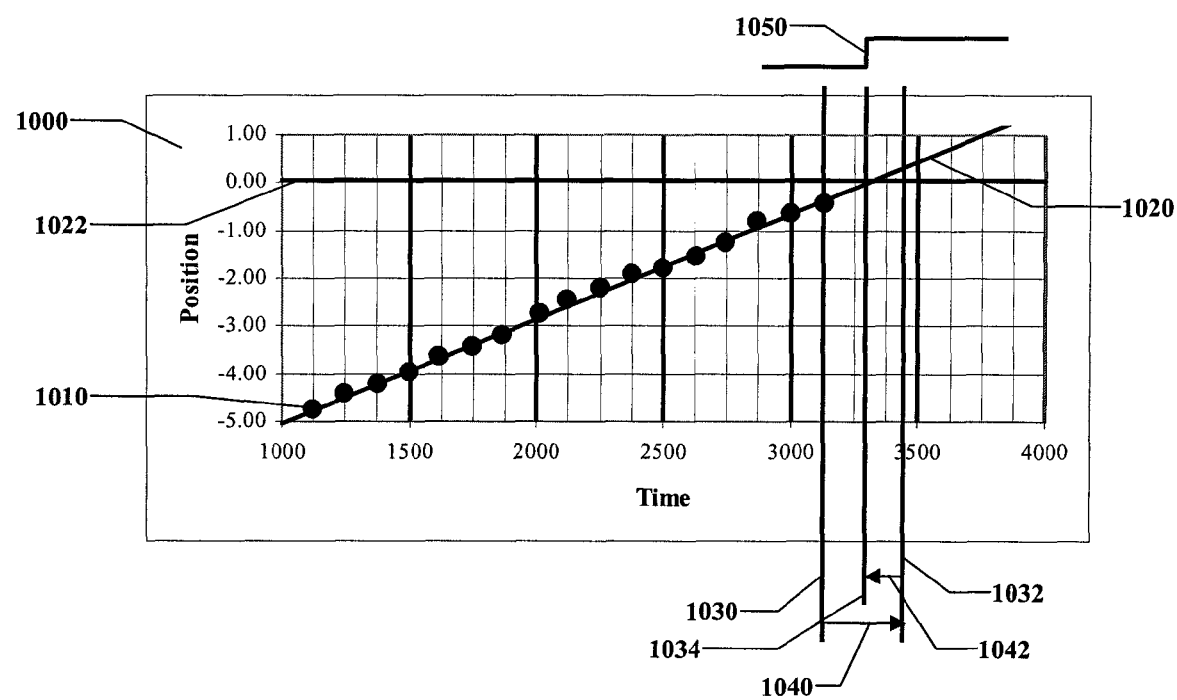
FIG. 10 shows a prediction of the time at which an object will cross a reference point, but wherein the predicted time is in the past and a signal has already occurred.

FIGS. 8-10 show prediction and signal generation for an illustrative embodiment. Note that prediction in this embodiment is a combined effect of the capture, measurement, selection, and decision processes operating in concert.

FIG. 8 shows a plot 800 of capture time t vs. object position x for an object moving through the field of view. Time values are in microseconds from some arbitrary starting point, and position values are in pixels measured from reference point 822. Time values come from the capture process and position values come from the measurement process, as described elsewhere. The measurement process also produces score measurements s for each point, not shown. For simplicity of illustration the image capture/transfer/compute rate is about 10 KHz, giving a period of about 100 μs.

(t, x) points are plotted, including example point 810. Current time 832 is shown, and corresponds to decision point 740 for an image whose exposure interval is centered on exposure time 830, the most recent time for which a position measurement is available. Decision delay 840 is the interval between exposure time 830 and current time 832. So far three points have been obtained.

In the illustrative embodiment, three points of sufficiently high score are considered sufficient to make a prediction of the reference time. The predication is made using best-fit line 820 through the three points obtained so far, where line 820 is computed by the well-known least squares method. The predicted time 834 is the time at which best-fit line 820 crosses reference point 822.

It is of course possible to fit any suitable curve to (t, x) points, where the curve represent some function f wherein x=f(t). Clearly best-fit line 820 is an example of such a curve, corresponding to an assumption of constant velocity. In another embodiment wherein constant acceleration is assumed, a best-fit parabola could be used.

In the example of FIG. 8, signal delay interval 842 from current time 832 to predicted time 834 is about 2170 μs. In the illustrative embodiment, a signal delay interval greater than 1000 μs is considered too long to be reliable; not only is the predicted time inaccurate, but there isn't sufficient evidence that the object will indeed cross the reference point at all. Therefore, no signal is scheduled.

FIG. 9 shows a plot 900 similar to that of FIG. 8. In this case, however, 15 (t, x) points have been obtained, including example point 910. Current time 932, most recent exposure time 930, and decision delay 940 are shown. Best fit line 920 crosses reference point 922 at predicted time 934. Signal delay interval 942 is about 190 μs. Since there are at least three points of sufficiently high score, and signal delay interval 942 is less than 1000 μs, a signal is scheduled to occur at predicted time 934.

Given the criteria for scheduling a signal in the illustrative embodiment, it is clear that a signal would have been scheduled many times prior to current time 932. For example, at time 950 when point 952 was the most recent data available, the criteria would also be met and a pulse would have been scheduled. As the object moves closer to reference point 922, the prediction becomes more accurate because there are more points with which to fit the line, and because the prediction is less of an extrapolation. Therefore, when a signal is scheduled it replaces any previously scheduled signal, so that in effect the predicted signal time is updated for every image as the object approaches the reference point.

FIG. 10 shows a plot 1000 similar to that of FIG. 8. In this case, however, 17 (t, x) points have been obtained, including example point 1010. Current time 1032, most recent exposure time 1030, and decision delay 1040 are shown. Best fit line 1020 crosses reference point 1022 at predicted time 1034. Signal delay interval 1042 is negative by about 130 µs, which means that the signal should have already happened due to a previously scheduled signal.

There are two cases. First, if a signal has indeed happened, as shown in FIG. 10 by pulse edge 1050 occurring before current time 1032, there is nothing left to do for the current object. No signal is scheduled. If for some reason a signal has not yet happened (one may be scheduled but not yet happened, or none may be scheduled), a signal is produced immediately.

While FIGS. 8-10 and the accompanying description describe an embodiment with no latency, it is possible to introduce a positive or negative latency by adding a positive or negative value to the predicted reference time, e.g. times 834, 934, and 1034. The latency can be made adjustable using HMI 350. Other than the additional mechanism for adding this value, the above-described embodiment remains unchanged. No matter what the latency, the signal is generated with the best available data.

The added latency can be viewed as decreasing the decision delay, e.g. 750, 840, 940, and 1040, by the latency value. Positive latency effectively makes the decision delay shorter, and negative latency effectively makes it longer. When the latency equals the actual decision delay, the effective decision delay is 0 and the signal generation is no longer a prediction, and the extrapolation becomes an interpolation. As latency increases, furthermore, more data points can be obtained for the line fitting. Thus signal timing accuracy increases as latency increases.

With no latency, the best reference point is at the downstream end of the field of view. This allows the entire FOV to be used and the maximum number of (t, x) points to be produced for the prediction. As the reference point moves upstream less of the FOV is used and fewer points are available, reducing accuracy. If the reference point is too far upstream in the FOV, the system will not operate properly.

As the reference point moves beyond the FOV downstream, the extrapolation is greater and accuracy will suffer. At some point it will no longer be possible to satisfy the 1000 µs maximum signal delay interval criterion. In an illustrative embodiment, once an object moves completely out of the FOV the signal is scheduled regardless of the signal delay interval.

The forgoing discussion of prediction pertains to specific embodiments and it is contemplated that significant modifications or entirely different methods and processes that occur to one skilled in the art can be used to achieve similar effects, or other desired effects in accordance with the teachings described herein. For example, all of the numerical constants used are understood to be examples and not limiting. It is not necessary that any signal delay be considered too long to be reliable. The maximum reliable signal delay, and the minimum number of points needed to schedule a signal, can vary from image to image or object to object based on any desired criteria. A limit on the maximum number of points could be used, such that once such a limit is reached no rescheduling of the signal would occur.

Illustrative Selection Process

There are a wide variety of ways to arrange a selection process and a decision process for a linear detector according to the invention. In some embodiments, the two processes operate independently—the selection process chooses object measurements from the image measurements, and passes these along to the decision process, in a manner that is responsive to the image measurements but not to anything that the decision process does. In an illustrative embodiment the selection process, shown by the flowchart of FIG. 11 and described in this section, operates in concert with the decision processes to select the object measurements and use them to detect and locate an object. Thus while the two processes will be shown by separate figures and described in separate sections, there will be of necessity some overlap of description. Furthermore, as noted above, the selection and decision processes could equivalently be combined into one complex process, but describing them separately aids clarity.

As described above, for each captured image we have three values (s, t, x); two image measurements from the measurement process and a capture time from the capture process. A selection process must select object measurements from among the image measurements (s, x), to be passed along to the decision process. In the illustrative embodiment selection is done on a per-image basis, so an (s, x) pair is either selected or not from a given image. Capture time for a selected image is then included, so the decision process gets (s, t, x) triplets from selected images. Any other suitable strategy for selecting object measurements from image measurements, with or without capture times or other data, can be used within the scope of the invention.

The selection process ignores image measurements when no object appears to be passing through the FOV. The selection process is called inactive at these times.

When an object appears to be passing through the FOV, the selection process is called active. It selects a set of (s, t, x) triplets to be used by the decision process to decide if an object has been detected, and, if so, to locate it by calculating the reference time, wherein the calculation may or may not be a prediction depending on the desired latency as described above.

The selection process may select some or all of the triplets corresponding to each object, although in typical cases only some are selected. The rules will now be summarized, and then described in detail in conjunction with FIG. 11. In the following description, numerical constants pertain to the illustrative embodiment; any other suitable values or methods for carrying out selection can be used within the scope of the invention.

Selection for a given object begins (i.e. the selection process becomes active) when an image is found for which $s \geq 0.6$ and x is upstream from the reference point by at least 2 pixels. The upstream requirement provides hysteresis in object detection; an object that is stationary or moving very slowly will not be detected multiple times as it crosses the reference point.

If selection is active and s<0.6 for 3 consecutive images, the object is considered to have passed through the field of view, and selection becomes inactive.

No more than 128 triplets are used for any object, because as the values get older they tend to be a less reliable indication of what is happening in the present. Three 128-element first-in first-out (FIFO) buffers are used to hold the most recent triplets. New triplets are added to the FIFOs, and if they are full the oldest triplet is removed and its object measurements are deselected, as if they were never selected in the first place. It can be seen that the selection process is inactive when the FIFOs are empty, and active otherwise.

If the FIFOs are full and the x measurements within are centered around the reference point, selection ends and becomes inactive. This rule is useful in the case where the desired latency is long enough that reference time can be calculated by interpolation (i.e. not predicted); once the FIFOs are full and the x measurements are centered about the reference point, any additional measurements will degrade the accuracy of the interpolation.

In the following description of FIG. 11, it is assumed that the direction of motion is positive x, so that downstream positions have x values greater than upstream positions. It will be clear to one skilled in the art how to modify the description so as to have a negative direction of motion, or to have objects be detected and located moving in either direction.

Figure 11:
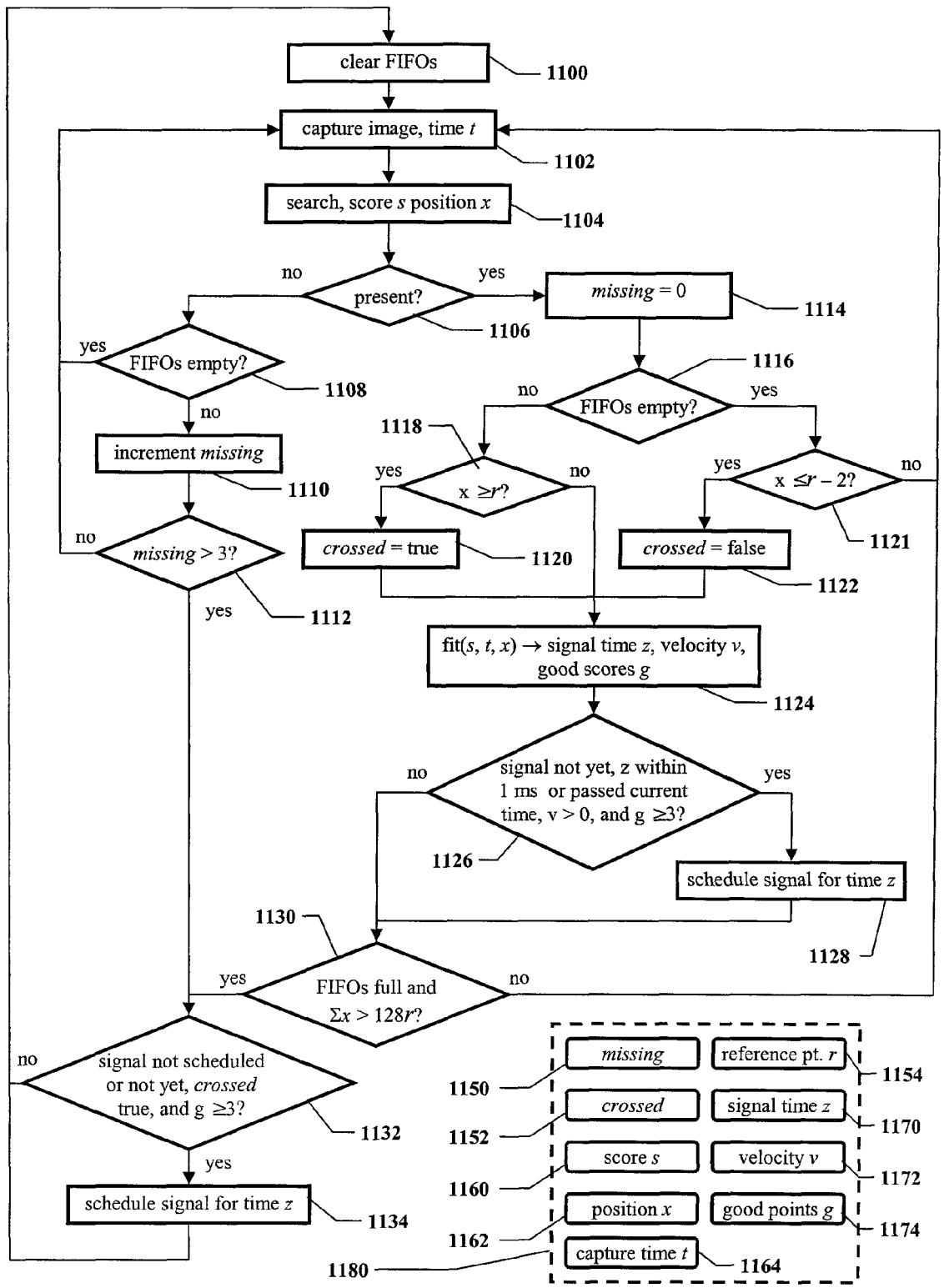
FIG. 11 shows a flowchart of a portion of a selection process in an illustrative embodiment, portions of other processes that interact with the selection process, and a memory used to hold values needed by the processes.

In FIG. 11, reset step 1100 clears the FIFOs (see FIG. 12), making selection inactive. This is used for system initialization and at times when selection ends for a given object.

Capture step 1102 (a portion of the capture process) captures the next image, also producing capture time (t) 1164. Search step 1104 (a portion of the measurement process) uses normalized correlation to produce score (s) 1160 and position (x) 1162. Presence test step 1106 judges the level of confidence that an object is present in the field of view; if score $1160 \geq 0.6$, the level of confidence is considered sufficient to indicate object presence. Note that this does not mean that an object is judged to be actually present; that decision is reserved for the decision process based on an analysis of all of the selected triplets.

If no object is judged present, first active test step 1108 directs the selection process to continue looking for an object if selection is inactive ("yes" branch). If no object is judged present but first active test step 1108 indicates that selection is active, increment step 1110, missing test step 1112, and missing counter 1150 are used to detect 3 consecutive images for which no object appears present. If fewer than 3 such image are detected so far, control returns to capture step 1102.

If 3 consecutive images for which no object appears present are detected when selection is active, final decision step 1132 (a portion of the decision process) is entered. If three conditions are met, first signal step 1134 (a portion of a signaling process) schedules a signal to be produced at signal time (z) 1170 (computed as described below). The first condition is that no signal has already been scheduled or has occurred. The second condition is that crossed flag 1152 indicates that the object has actually crossed the reference point. The third condition is the good points counter (g) 1174 (maintained by the decision process) indicates that at least 3 triplets in the FIFOs have $s \geq 0.75$. This third condition is the criterion that the decision process uses to decide that an object is detected. Whether or not a signal is scheduled, control returns to reset step 1100.

If presence test step 1106 judges that the level of confidence is sufficient (score $1160 \geq 0.6$), missing initialize step 1114 sets missing counter 1150 to 0. Second active test step 1116 determines whether or not this is the first image of a new object. If it is ("yes" branch), hysteresis test step 1121 determines whether or not the object appears sufficiently upstream of reference point (r) 1154. If not ("no" branch), control transfers to capture step 1102, and selection remains inactive. If the object is sufficiently upstream, crossed initialize step 1122 sets crossed flag 1152 to false. Selection now becomes active.

If second active test step 1116 indicates that this is not the first image of a new object ("no" branch), cross test step 1118 and cross set step 1120 set crossed flag 1152 to true if the object crosses reference point 1154.

When control transfers to line fit step 1124 (a portion of the decision process), object measurements score 1160 and position 1162 have been selected, and capture time 1164 is available. These values are used to calculate a best fit line as described above in relation to FIGS. 8, 9, and 10, and below in relation to FIG. 12. The results of these calculations include signal time (z) 1170, object velocity (v) 1172, and good points counter (g) 1174.

Running decision step 1126 implements the signal scheduling rules described in relation to FIGS. 8, 9, and 10. A signal is scheduled for signal time 1170 by second signal step 1128 if four conditions are met:

1. The signal has not already happened;
2. Signal time 1170 is within 1 ms. of the current time (which includes cases where the current time has passed signal time 1170);
3. Object velocity 1172 indicates downstream motion (crossed flag 1152 cannot be used here because the object may only be predicted to cross reference point 1154 at some future time; requiring downstream motion is a suitable alternative);
4. Good points counter 1174 indicates that at least 3 triplets in the FIFOs have $s \geq 0.75$.

Centered test step 1130 implements the rule described above for the case where the FIFOs are full and the x measurements are centered around reference point 1154. Note that the test for centered measurements is written as $\Sigma x > 128 r$, which requires that the average x in the FIFO exceeds reference point 1154. The assumptions here apply to the illustrative embodiment: the direction of motion is positive and the FIFOs contain 128 elements. The test is written to avoid a divide, which is typically much more expensive than a multiply. Of course dividing by 128 is just an inexpensive shift, but in other embodiments the FIFO size might not be a power of 2.

If centered test step 1130 passes ("yes" branch"), control transfers to final decision step 1132 and selection will become inactive at reset step 1100. If the test fails ("no" branch), control passes to capture step 1102 and selection remains active.

In should be noted that in the illustrative embodiment, if a scheduled signal occurs it does not cause selection to become inactive. No additional signal will be scheduled because running decision step 1126 and final decision step 1132 will always fail ("no" branches), but selection waits for the object to pass through to FOV, or for the x measurement to be centered, before becoming inactive. This is further insurance (in addition to the hysteresis provided by hysteresis test step 1121) against multiple detections for one object.

Other benefits arise from keeping selection active even though a signal has already occurred. One is that an interpolated reference time can be obtained some time after the reference point has been crossed. This should be more accurate than any predicted time, and can be compared with a predicted time to assess system accuracy and to automatically adjust to eliminate any residual latency in the system. Another is that other characteristics of the object (such as its velocity) can be obtained and, if desired, communicated by means of other signals.

Missing counter 1150, crossed flag 1152, reference point 1154, score 1160, position 1162, capture time 1164, signal time 1170, velocity 1172, and good points counter 1174 are stored in memory 1180, which can be a portion of SRAM 320.

The forgoing discussion of a selection process pertains to specific embodiments and it is contemplated that significant modifications or entirely different methods and processes that occur to one skilled in the art can be used to achieve similar effects, or other desired effects in accordance with the teachings described herein. For example, all of the numerical constants used are understood to be examples and not limiting. The rules for scheduling a signal can be changed as appropriate. There need not be a limit on the number of triplets used for an object. Good points counter 1174 can be eliminated, or replaced with different statistics such as an average of the scores in the FIFO, for example.

Illustrative Decision Process

Figure 12:
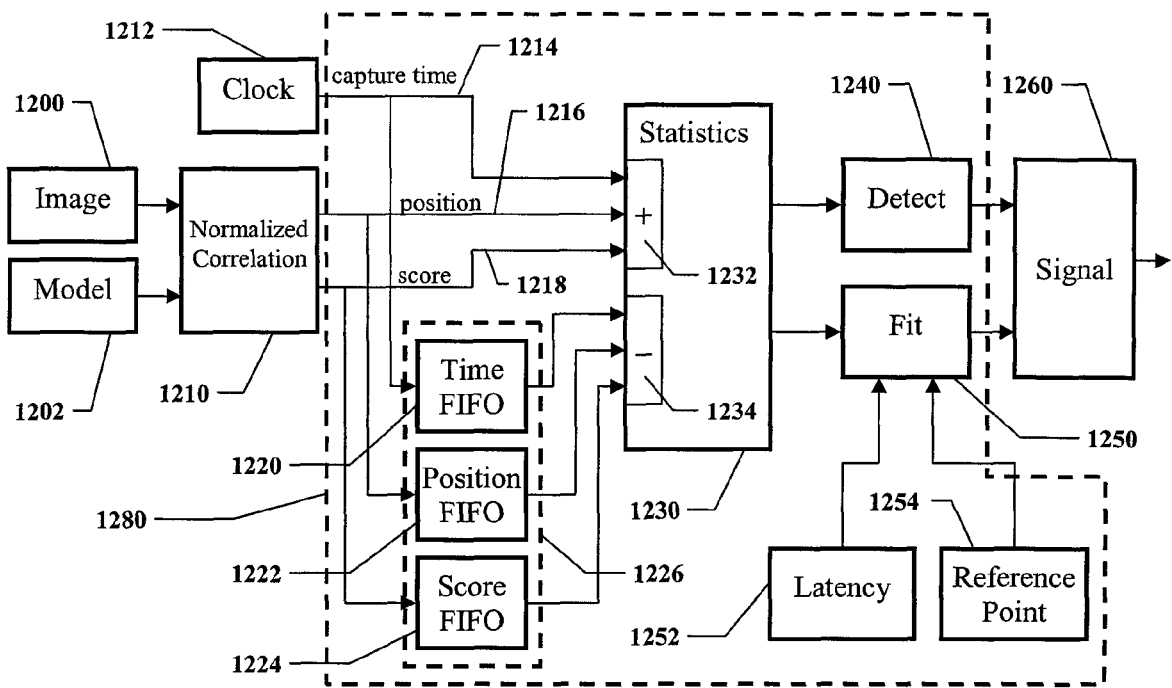
FIG. 12 shows a block diagram of a portion of a decision process in an illustrative embodiment, as well as portions of other processes that interact with the decision process.

FIG. 12 shows a decision process portion 1280 used in the illustrative embodiment described above in relation to FIGS. 8, 9, 10, and 11. A capture process provides image 1200, and normalized correlation process 1210 uses model 1202 to produce image measurements position (x) 1216 and score (s) 1218. A capture process uses clock 1212 to produce capture time (t) 1214.

Selected (s, t, x) triplets are passed to decision process portion 1280 and placed in capture time FIFO 1220, position FIFO 1222, and score FIFO 1224, which together comprise FIFOs 1226 as further described above. Selected (s, t, x) triplets are also passed to statistics element 1230, which computes $\Sigma t$, $\Sigma t^2$, $\Sigma x$, $\Sigma tx$, and $\Sigma(s \geq 0.75)$ as required for the well-known least-squared line fit and for good points counter 1174. Sums are computed by addition element 1232, and are taken over all the triplets in FIFOs 1226.

If FIFOs 1226 are full when a new (s, t, x) triplet is selected, the oldest triplet is passed to subtraction element 1234 which subtracts from the above sums as required to effectively deselect the measurements. It can be seen that at most one set of additions and one set of subtractions are needed for each selected (s, t, x) triplet; it is not necessary to recompute the sums over the entire contents of FIFOs 1226 for each triplet.

For reasons of numerical accuracy and computational efficiency, it is desirable to keep all of the sums using t values that are relative to the oldest time in capture time FIFO 1220. This requires a somewhat more complex procedure for handling a new triplet when FIFOs 1226 are full, but the extra cost of doing so is more than offset by other savings in many embodiments.

In the formulas below for updating the sums when FIFOs 1226 are full, make the following definitions:

t new capture time 1214
x new position 1216
$t_0$ oldest time from capture time FIFO 1220
$t_1$ second oldest time from capture time FIFO 1220
$x_0$ oldest position from position FIFO 1222
T current $\Sigma t$
Q current $\Sigma t^2$
X current $\Sigma \chi$
C current $\Sigma tx$
T' updated $\Sigma t$
Q' updated $\Sigma t^2$
x' updated $\Sigma x$
C' updated $\Sigma tx$
N size of FIFOs 1226 (128 in illustrative embodiment)
$t_u$ $t_1 - t_0$
$t_v$ $t - t_0$ The update formulas for the sums are:

$$X' = X + x - x_0$$

$$T' = T + t_v - N t_u$$

$$Q' = Q + t_u[(N-1)t_u - 2T] + (t_v - t_u)^2$$

$$C' = C + t_u(x_0 - X) + x(t_v - t_u)$$

For each selected (s, t, x) triplet, detection element 1240 decides whether or not there are at least 3 scores in score FIFO 1224 that are at least 0.75, i.e. $[\Sigma(s \geq 0.75)] \geq 3$. If not, the decision process judges that no object has yet been detected and so no signal is produced by signaling process 1260. Detection element 1240 corresponds to a portion of running decision step 1126 and final decision step 1132, wherein a test is made for good points counter (g) 1174 $\geq 3$.

For each selected (s, t, x) triplet, line fit element 1250 uses sums computed by statistics element 1230, latency value 1252, and reference point value 1254, to compute a best-fit line and, from the parameters of that line, signal time 1170 used by the selection process of FIG. 11 and signaling process 1260, and object velocity 1172 used by the selection process of FIG. 11. Well-known formulas are used to compute the best-fit line, signal time 1170, and object velocity 1172 (which is just the slope of the best-fit line).

Latency value 1252 and reference point value 1254 are stored in SRAM 320 (FIG. 3), and can be adjusted if desired using HMI 350.

The forgoing discussion of a decision process pertains to specific embodiments and it is contemplated that significant modifications or entirely different methods and processes that occur to one skilled in the art can be used to achieve similar effects, or other desired effects in accordance with the teachings described herein. For example, all of the numerical constants used are understood to be examples and not limiting. Other curves can be fit to the points instead of a line. A weighted line fit can be used, where for example the weights are a function of the age of the points.

Illustrative Signaling Process

The signaling process of an illustrative embodiment has been described above in relation to timer 334 and signal 362 of FIG. 3; signal scheduling in relation to FIGS. 8, 9, and 10; pulse edge 1050 of FIG. 10; first signal step 1134 and second signal step 1128 of FIG. 11; and signaling process 1260 of FIG. 12.

Timer 334 is set up to run at 1/32 of microcontroller 300 clock rate, giving a resolution of 0.64 µs. It can easily be set up to produce a pulse after a programmable delay (see ATMEL document 6175E-ATARM-04-Apr-06), which would be equal to the difference between the desired signal time and the current time.

To achieve slightly higher timing accuracy, timer 334 is used for both clock 1212 and pulse edge 1050 (which appears on signal 362). When a signal is scheduled for a certain time, the compare registers of timer 334 are set to produce the pulse edges. The compare registers are set on-the-fly, without stopping the timer, and only if the pulse has not yet started due to a previous scheduling. The desired operation can be achieved with a suitable assembly language routine that runs with interrupts off.

The forgoing discussion of a signaling process pertains to specific embodiments and it is contemplated that significant modifications or entirely different methods and processes that occur to one skilled in the art can be used to achieve similar effects, or other desired effects in accordance with the teachings described herein. Signals need not be pulse edges and can be produced by many other means known in the art. Many different software and hardware elements can be used to achieve desired effects.

Additional Object Information Produced by a Decision Process

It will be apparent to one skilled in the art that, based on the above discussion of illustrative measurement, selection, and decision processes, a wide range of object information can be produced by a decision process that analyzes object measurements. This object information includes, but is not limited to, knowledge responsive to object presence in the field of view, and more particularly to a state of being present, or an event comprising a transition among such states, or both.

Examples of states of being present include, but are not limited to:
- an object is in the FOV;
- an object is in the FOV upstream from a reference point;
- an object is in the FOV downstream from a reference point;
- an object is moving in the FOV at or above a certain velocity; and
- an object is in the FOV between two reference points.

Examples of events include, but are not limited to:
- an object enters the FOV;
- an object passes through the FOV;
- an object crosses a reference point in either direction;
- an object crosses a reference point in a specific direction;
- an object reaches an apex of motion in the FOV; and
- an object comes to rest in the FOV.

In order to more fully understand illustrative embodiments that produce knowledge responsive to object presence in the field of view, consider an example. Let M be the set of image measurements produced by a measurement process. Let P be a subset (maybe all) of M containing those image measurements that are responsive to image presence. The selection process is responsive to some or all of P and produces object measurements S, a subset of M. S may contain some, all, or none of P. S is used to get the knowledge responsive to object presence in the field of view. It may be that no measurement in S is responsive to object presence, but still all of S is responsive to the object because of how they were selected.

To make this concrete, suppose that M includes score and position measurements. Score measurements are responsive to object presence—higher values mean the object is more likely to be present. These are the subset P that the selection step uses. Position measurements are not responsive to object presence—one cannot tell by the value of a position measurement whether an object is present or not. If there is no object, the position measurements will be meaningless (just noise), but one cannot tell that from their values. So the selection step uses the score values (subset P) to select the measurements in S, which may be just position measurements. While those position measurements are not responsive to object presence, the fact that they are selected means that they are responsive to the object because, having been selected responsive to the scores, they are the ones that give valid object positions. A decision process can use these selected object positions to determine, for example, whether an object has crossed a reference point.

Figure 13:
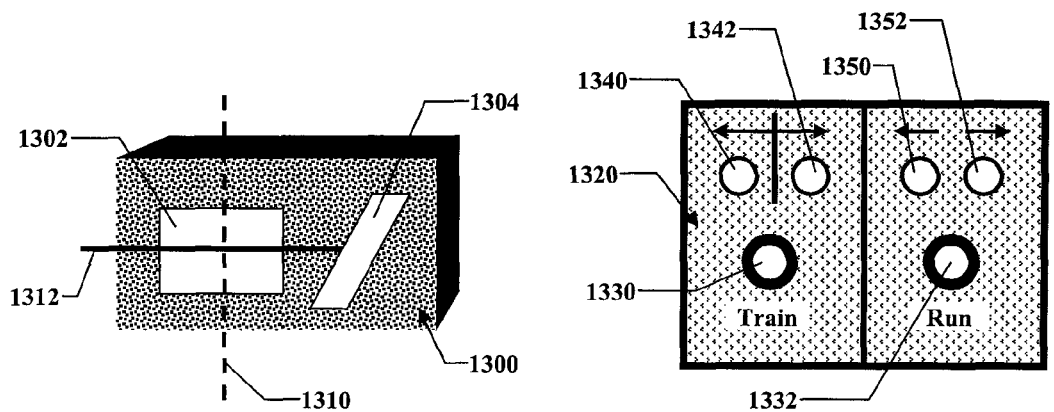
FIG. 13 shows a human-machine interface used as part of a training process, and to set a reference point, in an illustrative embodiment, as well as an example object used by the training process.

Illustrative HMI for Training Process, Setting a Reference Point, Testing, and/or Running FIG. 13 shows an HMI and example box for a training process, and for setting a reference point, as might be employed in setting up a linear detector for use in the application shown in FIG. 1.

Example box 1300 containing example object 1302 (a label on example box 1300) and decorative marking 1304 is placed so that example object 1302 appears in FOV 1312 of a linear detector (not shown). Reference point 1310 is also shown.

HMI 1320 contains train button 1330, run button 1332, negative position indicator 1340, positive position indicator 1342, negative direction indicator 1350, and positive direction indicator 1352. When train button 1330 is pressed with example object 1302 in FOV 1312, one or more images are captured and used to create a model as further described above in relation to FIG. 5.

Train button 1330 can also be used to provide a setup signal used to set reference point 1310. When train button 1330 is pressed with example object 1302 in FOV 1312, one or more images are captured and used along with a model by a normalized correlation process to find example object 1302. Reference point 1310 is set to the position found.

Note that train button 1330 can be used to initiate the training process, to provide a setup signal for setting a reference point, or to accomplish both with a single press of the button.

Figure 14:
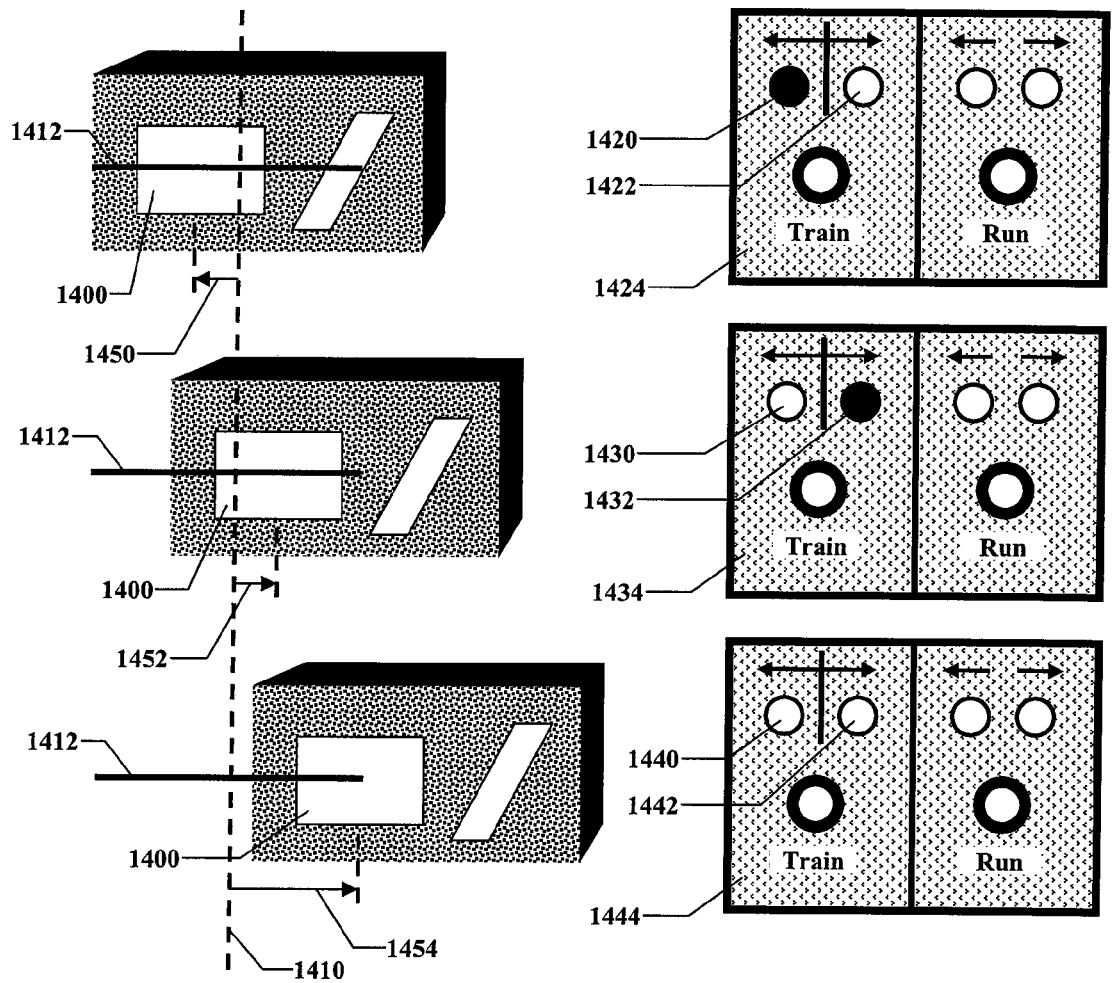
FIG. 14 shows a human-machine interface used to test the operation of an illustrative embodiment of a system according to the invention, as well as an example object used in the testing.

FIG. 14 shows test object 1400 in three test positions relative to FOV 1412 and reference point 1410: first test position 1450, where test object 1400 is at a negative position relative to reference point 1410 within FOV 1412; second test position 1452 where test object 1400 is at a positive position relative to reference point 1410 within FOV 1412; and third test position 1454, where test object 1400 is so far away from reference point 1410 that it is no longer be found in FOV 1412.

An HMI comparable to HMI 1320 of FIG. 13 is shown in three states corresponding to the three test positions: first HMI 1424 corresponds to first test position 1450; second HMI 1434 corresponds to second test position 1452; and third HMI 1444 corresponds to third test position 1454. Note that first HMI 1424, second HMI 1434, and third HMI 1444 represent the same HMI in three different states.

Similarly, first negative position indicator 1420, second negative position indicator 1430, and third negative position indicator 1440 represent the same indicator in three different test positions, and first positive position indicator 1422, second positive position indicator 1432, and third positive position indicator 1442 represent the same indicator in three different test positions.

When test object 1400 is at first test position 1450, first negative position indicator 1420 is on and first positive position indicator 1422 is off, indicating that test object 1400 is found in FOV 1412 in a negative position relative to reference point 1410.

When test object 1400 is at second test position 1452, second negative position indicator 1430 is off and second positive position indicator 1432 is on, indicating that test object 1400 is found in FOV 1412 in a positive position relative to reference point 1410.

When test object 1400 is at third test position 1454, third negative position indicator 1440 and third positive position indicator 1442 are both off, indicating that test object 1400 cannot be found in FOV 1412.

By using test objects similar to test object 1400, and indicators as shown and described, an installation technician or other user of a linear detector can verify that a suitable model is in use, and that the reference point is as desired. The indicators should show that a test object is found when one sufficiently similar in appearance to the model in use in placed in the FOV, and should show that nothing is found when no such object is present.

Figure 15:
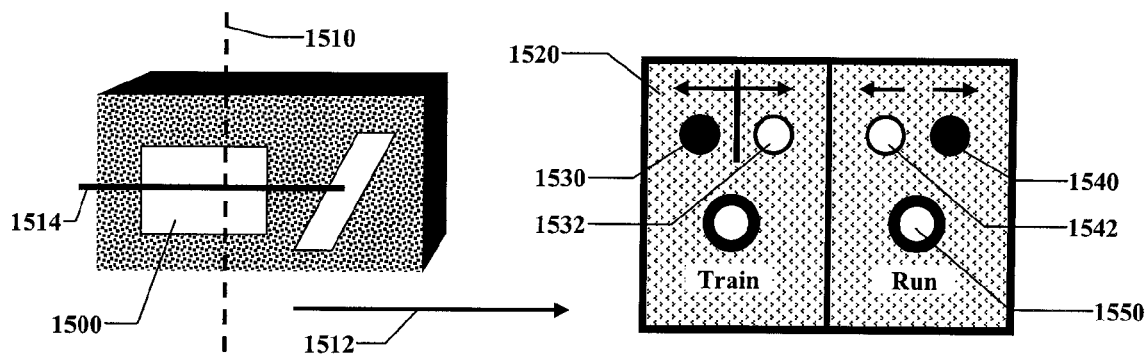
FIG. 15 shows a human-machine interface used in an illustrative embodiment to establish a direction of motion and place the system into a running state, as well as an example object used in so doing.

FIG. 15 shows HMI 1520 used to establish positive direction of motion 1512 and place the linear detector into a running state. Run button 1550 is pressed to cycle among three states: training mode, with negative direction indicator 1542 and positive direction indicator 1540 both off; running with positive direction of motion, with negative direction indicator 1542 off and positive direction indicator 1540 on, as shown in the figure; and running with negative direction of motion, with negative direction indicator 1542 on and positive direction indicator 1540 off. In an illustrative embodiment, the training process is inhibited when the linear detector is in one of the two running states.

In FIG. 15, object 1500 is in FOV 1514, upstream of reference point 1510, which corresponds to a negative position since direction of motion 1512 is positive. Negative position indicator 1530 is on, and positive position indicator 1532 is off, indicating the object 1500 is found at a negative position within FOV 1514.

The forgoing discussion of an HMI pertains to specific embodiments and it is contemplated that significant modifications or entirely different methods and processes that occur to one skilled in the art can be used to achieve similar effects, or other desired effects in accordance with the teachings described herein. The HMI could make use of a personal computer instead of or in addition to buttons and indicators. The HMI could use alphanumeric indicators instead of simple lights, and could allow setting of any parameter used by an embodiment of the invention.

The foregoing has been a detailed description of various embodiments of the invention. It is expressly contemplated that a wide range of modifications, omissions, and additions in form and detail can be made hereto without departing from the spirit and scope of this invention. For example, the processors and computing devices herein are exemplary and a variety of processors and computers, both standalone and distributed can be employed to perform computations herein. Likewise, the linear array sensor described herein is exemplary and improved or differing components can be employed within the teachings of this invention. Also, some, or all, of the capture process, measurement process, decision process, and optional signaling process can be combined or parsed differently. Numerical constants used herein pertain to illustrative embodiments; any other suitable values or methods for carrying out the desired operations can be used within the scope of the invention. Accordingly, this description is meant to be taken only by way of example, and not to otherwise limit the scope of this invention.

The invention claimed is:

1. An optoelectronic system for providing information describing an object, comprising:
   an optical sensor that makes light measurements in a field of view;
      means for performing a motion process that provides relative motion between the object and the field of view in a direction of motion, such that the object passes through the field of view;
      means for performing a capture process that captures a plurality of one-dimensional images of the field of view, wherein
         each of the plurality of images are responsive to the respective light measurements;
         the images are oriented approximately parallel to the direction of motion; and
         at least a portion of the images correspond to a plurality of positions of the object relative to the field of view; and
      means for performing a process that analyzes at least a portion of the images so as to provide the information describing the object.

2. The system of claim 1, wherein the information describing the object comprises knowledge responsive to object presence in the field of view.

3. The system of claim 1, wherein
   the motion process is such that the object crosses a reference point at a reference time; and
   the information describing the object comprises an estimate of the reference time.

4. The system of claim 3, further comprising an electronic human-machine interface, and wherein the reference point is adjusted in response to the human-machine interface.

5. The system of claim 3, further comprising a signaling process that produces a signal that indicates the estimate of the reference time by occurring at a signal time that is responsive to the estimate of the reference time.

6. The system of claim 5, further comprising an electronic human-machine interface, and wherein the signal time is adjusted in response to the human-machine interface.

7. The system of claim 5, wherein there is no latency between the reference time and the signal time.

8. The system of claim 3, wherein the estimate of the reference time is determined by predicting the reference time.

9. The system of claim 3, further comprising
   an example object; and
   a setup signal that indicates that the example object is placed in the field of view at a setup position; and
   wherein the reference point is set responsive to the example object, the setup signal, and the setup position.

10. The system of claim 9, further comprising a signaling process that produces a signal responsive to the information describing the object, and wherein the signal occurs at a time when the object crosses the setup position.

11. The system of claim 9, further comprising a signaling process that produces a signal responsive to the information describing the object, and wherein the signal occurs at a time when the object is upstream from the setup position.

12. The system of claim 3, further comprising
   a test object; and
   a human-machine interface comprising an indicator that indicates a detection state chosen from among
      the test object is detected upstream from the reference point;
      the test object is detected downstream from the reference point; and
      the test object is not detected.

13. The system as in any one of claims 1-3, wherein the optical sensor comprises a linear optical sensor comprising a one-dimensional array of photoreceptors.

14. An optoelectronic system for providing information describing an object, comprising:
   an optical sensor that makes light measurements in a field of view;
      a motion element that provides relative motion between the object and the field of view in a direction of motion, such that the object passes through the field of view;
      a capture element that captures a plurality of one-dimensional images of the field of view, wherein
         each of the plurality of images are responsive to the respective light measurements;
         the images are oriented approximately parallel to the direction of motion; and
         at least a portion of the images correspond to a plurality of positions of the object relative to the field of view;
      a measurement element that analyzes at least a portion of the images so as to produce image measurements;
      a selection element that selects object measurements from among the image measurements, the object measurements comprising image measurements that are judged responsive to the object; and a decision element that analyzes the object measurements so as to produce the information describing the object.

15. The system of claim 14, wherein at least a portion of the image measurements are responsive to object presence in the field of view;

the selection element is responsive to at least a portion of the image measurements that are responsive to object presence in the field of view; and the information describing the object comprises knowledge responsive to object presence in the field of view.

16. The system of claim 14, wherein the motion element is such that the object crosses a reference point at a reference time;

at least a portion of the image measurements are responsive to object position in the field of view;

at least a portion of the object measurements are selected from among the image measurements that are responsive to object position in the field of view;

the decision element is responsive to at least a portion of the object measurements that are selected from among the image measurements that are responsive to object position in the field of view; and the information describing the object comprises an estimate of the reference time.

17. The system of claim 16, wherein the capture element process produces a plurality of capture times, each capture time being responsive to a time at which a corresponding image was captured; and the decision element is responsive to at least one of the capture times.

18. The system of claim 17, wherein the decision element comprises fitting a curve to points comprising at least a portion of the capture times and corresponding object measurements that are selected from among the image measurements that are responsive to object position in the field of view.

19. The system of claim 16, further comprising an electronic human-machine interface, and wherein the reference point is adjusted in response to the human-machine interface.

20. The system of claim 16, further comprising a signaling element that produces a signal responsive to the information describing the object, and wherein the signal indicates the information describing the object by occurring at a signal time that is responsive to the estimate of the reference time.

21. The system of claim 20, further comprising an electronic human-machine interface, and wherein the signal time is adjusted in response to the human-machine interface.

22. The system of claim 20, wherein there is no latency between the reference time and the signal time.

23. The system of claim 16, wherein the decision element determines the estimate of the reference time by predicting the reference time.

24. The system of claim 16, further comprising an example object; and a setup signal that indicates that the example object is placed in the field of view at a setup position; and wherein the reference point is set responsive to the example object, the setup signal, and the setup position.

25. The system of claim 24, further comprising a signaling element that produces a signal responsive to the information describing the object, and wherein the signal occurs at a time when the object crosses the setup position.

26. The system of claim 24, further comprising a signaling element that produces a signal responsive to the information describing the object, and wherein the signal occurs at a time when the object is upstream from the setup position.

27. The system of claim 16, further comprising a test object; and a human-machine interface comprising an indicator that indicates a detection state chosen from among the test object is detected upstream from the reference point;

the test object is detected downstream from the reference point; and the test object is not detected.

28. The system as in any one of claims 14-16, wherein the measurement element comprises a pattern detection element.

29. The system of claim 28, further comprising an example object; and a training element that obtains a model pattern responsive to the example object; and wherein the pattern detection element is responsive to the model pattern.

30. The system of claim 28, wherein the pattern detection element comprises a normalized correlation element.

31. The system as in any one of claims 14-16, wherein the optical sensor comprises a linear optical sensor comprising a one-dimensional array of photo receptors.

32. An optoelectronic system for detecting and locating an object, comprising:

a linear optical sensor comprising a linear array of photoreceptors that makes light measurements in a field of view;

means for performing a motion process that provides relative motion between the object and the field of view in a direction of motion, such that the object passes through the field of view and crosses a reference point at a reference time;

means for performing a capture process that captures a plurality of one-dimensional images of the field of view, and produces a plurality of capture times, each capture time being responsive to a time at which a corresponding image was captured, and wherein each of the plurality of images are responsive to the respective light measurements;

the images are oriented approximately parallel to the direction of motion; and at least a portion of the images correspond to a plurality of positions of the object relative to the field of view;

means for performing a measurement process that analyzes at least a portion of the images so as to produce position measurements and score measurements;

means for performing a decision process that uses the capture times, the position measurements, and the score measurements to produce an estimate of the reference time; and means for performing a signaling process that produces a signal that indicates the reference time by occurring at a signal time that is responsive to the estimate of the reference time.

33. The system of claim 32, wherein the decision process estimates the reference time by predicting the reference time.

34. The system of claim 32, wherein there is no latency between the reference time and the signal time.

35. An optoelectronic method for providing information describing an object, comprising:

using an optical sensor to make light measurements in a field of view;

providing relative motion between the object and the optical sensor in a direction of motion, such that the object passes through the field of view;

capturing a plurality of one-dimensional images of the field of view, wherein each of the plurality of images are responsive to the respective light measurements;

the images are oriented approximately parallel to the direction of motion; and at least a portion of the images correspond to a plurality of positions of the object relative to the field of view; and analyzing at least a portion of the images so as to provide the information describing the object.

36. The method of claim 35, wherein the information describing the object comprises knowledge responsive to object presence in the field of view.

37. The method of claim 35, wherein the relative motion is such that the object crosses a reference point at a reference time; and the information describing the object comprises an estimate of the reference time.

38. The method of claim 37, further comprising using an electronic human-machine interface to adjust the reference point.

39. The method of claim 37, further comprising producing a signal that indicates the estimate of the reference time by occurring at a signal time that is responsive to the estimate of the reference time.

40. The method of claim 39, further comprising using an electronic human-machine interface to adjust the signal time.

41. The method of claim 39, wherein there is no latency between the reference time and the signal time.

42. The method of claim 37, wherein the analyzing step comprises predicting the reference time.

43. The method of claim 37, further comprising providing an example object;

providing a setup signal that indicates that the example object is placed in the field of view at a setup position; and setting the reference point in response to the example object, the setup signal, and the setup position.

44. The method of claim 43, further comprising producing a signal responsive to the information describing the object, wherein the signal occurs at a time when the object crosses the setup position.

45. The method of claim 43, further comprising producing a signal responsive to the information describing the object, and wherein the signal occurs at a time when the object is upstream from the setup position.

46. The method of claim 37, further comprising providing a test object; and using a human-machine interface to indicate a detection state chosen from among the test object is detected upstream from the reference point;

the test object is detected downstream from the reference point; and the test object is not detected.

47. The system as in any one of claims 35-37, wherein the optical sensor comprises a linear optical sensor comprising a one-dimensional array of photoreceptors.

48. An optoelectronic method for providing information describing an object, comprising:

using an optical sensor to make light measurements in a field of view;

providing relative motion between the object and the optical sensor in a direction of motion, such that the object passes through the field of view;

capturing a plurality of one-dimensional images of the field of view, wherein each of the plurality of images are responsive to the respective light measurements;

the images are oriented approximately parallel to the direction of motion; and at least a portion of the images correspond to a plurality of positions of the object relative to the field of view;

analyzing at least a portion of the images so as to produce image measurements;

selecting object measurements from among the image measurements, the object measurements comprising image measurements that are judged responsive to the object; and analyzing the object measurements so as to produce the information describing the object.

49. The method of claim 48, wherein at least a portion of the image measurements are responsive to object presence in the field of view;

the selecting step is responsive to at least a portion of the image measurements that are responsive to object presence in the field of view; and the information describing the object comprises knowledge responsive to object presence in the field of view.

50. The method of claim 48, wherein the relative motion is such that the object crosses a reference point at a reference time;

at least a portion of the image measurements are responsive to object position in the field of view;

at least a portion of the object measurements are selected from among the image measurements that are responsive to object position in the field of view;

the step of analyzing the object measurements is responsive to at least a portion of the object measurements that are selected from among the image measurements that are responsive to object position in the field of view; and the information describing the object comprises an estimate of the reference time.

51. The method of claim 50, further comprising producing a plurality of capture times, each capture time being responsive to a time at which a corresponding image was captured; and wherein the step of analyzing the object measurements is further responsive to at least one of the capture times.

52. The method of claim 51, wherein the step of analyzing the object measurements comprises fitting a curve to points comprising at least a portion of the capture times and corresponding object measurements that are selected from among the image measurements that are responsive to object position in the field of view.

53. The method of claim 50, further comprising using an electronic human-machine interface to adjust the reference point.

54. The method of claim 50, further comprising producing a signal that indicates the estimate of the reference time by occurring at a signal time that is responsive to the estimate of the reference time.

55. The method of claim 54, further comprising using an electronic human-machine interface to adjust the signal time relative to the estimate of the reference time.

56. The method of claim 54, wherein there is no latency between the reference time and the signal time.

57. The method of claim 50, wherein the estimate of the reference time is determined by predicting the reference time.

58. The method of claim 50, further comprising
providing an example object;
providing a setup signal that indicates that the example object is placed in the field of view at a setup position; and
setting the reference point in response to the example object, the setup signal, and the setup position.

59. The method of claim 58, further comprising producing a signal responsive to the estimate of the reference time, wherein the signal occurs at a time when the object crosses the setup position.

60. The method of claim 58, further comprising producing a signal responsive to the estimate of the reference time, and wherein the signal occurs at a time when the object is upstream from the setup position.

61. The method of claim 50, further comprising
providing a test object; and
using a human-machine interface to indicate a detection state chosen from among
the test object is detected upstream from the reference point;
the test object is detected downstream from the reference point; and
the test object is not detected.

62. The method as in any one of claims 48-50, wherein the step of analyzing at least a portion of the plurality of images comprises performing pattern detection.

63. The method of claim 62, further comprising
providing an example object; and
obtaining a model pattern responsive to the example object; and
wherein the pattern detection is responsive to the model pattern.

64. The method of claim 62, wherein the pattern detection step comprises performing normalized correlation.

65. The method as in any one of claims 48-50, wherein the optical sensor comprises a linear optical sensor comprising a one-dimensional array of photoreceptors.

66. An optoelectronic method for detecting and locating an object, comprising:
using a linear optical sensor to make light measurements in a field of view;
providing relative motion between the object and the optical sensor in a direction of motion, such that the object passes through the field of view and crosses a reference point at a reference time;
capturing a plurality of one-dimensional images of the field of view, wherein
each of the plurality of images are responsive to the respective light measurements;
the images are oriented approximately parallel to the direction of motion; and
at least a portion of the images correspond to a plurality of positions of the object relative to the field of view;
producing a plurality of capture times, each capture time being responsive to a time at which a corresponding image was captured;
analyzing at least a portion of the plurality of images so as to produce position measurements and score measurements;
using the capture times, the position measurements, and the score measurements to produce an estimate of the reference time; and
producing a signal that indicates the reference time by occurring at a signal time that is responsive to the estimate of the reference time.

67. The method of claim 66, wherein the step of using the capture times, the position measurements, and the score measurements to produce an estimate of the reference time comprises predicting the reference time.

68. The method of claim 66, wherein there is no latency between the reference time and the signal time.

* * * * *